US 6,709,042 B2

(12) United States Patent
Takemura et al.

(10) Patent No.: US 6,709,042 B2
(45) Date of Patent: Mar. 23, 2004

(54) MOTORCYCLE WITH WINDOW SCREEN STRUCTURE

(75) Inventors: Hiroo Takemura, Saitama (JP); Koji Sakagami, Saitama (JP); Tsuguto Ichiriki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/233,503

(22) Filed: Sep. 4, 2002

(65) Prior Publication Data

US 2003/0062740 A1 Apr. 3, 2003

(30) Foreign Application Priority Data

Sep. 11, 2001 (JP) .......................... 2001-275479

(51) Int. Cl.⁷ ................................................ B62J 23/00
(52) U.S. Cl. ...................................................... 296/78.1
(58) Field of Search ................................ 296/77.1, 78.1

(56) References Cited

U.S. PATENT DOCUMENTS

| | | | | |
|---|---|---|---|---|
| 4,696,509 A | * | 9/1987 | Yagasaki et al. ........... | 296/78.1 |
| 4,707,017 A | | 11/1987 | Minobe et al. | |
| 4,830,423 A | * | 5/1989 | Nebu et al. ................ | 296/78.1 |
| 4,911,494 A | * | 3/1990 | Imai et al. ................. | 296/78.1 |
| 5,730,483 A | * | 3/1998 | Greger ....................... | 296/78.1 |
| 5,855,404 A | * | 1/1999 | Saunders ................... | 296/78.1 |
| 6,254,166 B1 | * | 7/2001 | Willey ....................... | 296/78.1 |
| 6,293,606 B1 | * | 9/2001 | Jarosz et al. .............. | 296/78.1 |

FOREIGN PATENT DOCUMENTS

| | | |
|---|---|---|
| DE | 39 41 875 A | 6/1991 |
| JP | 3-65483 | 3/1991 |

OTHER PUBLICATIONS

Patent Abstracts of Japan, Oct. 13, 2000, vol. 2000, No. 9 (abstract of JP 2000–159172).
Patent Abstracts of Japan, Sep. 20, 1990, vol. 14, No. 440 (abstract of JP 02–175389).

* cited by examiner

Primary Examiner—D. Glenn Dayoan
Assistant Examiner—Lori L Coletta
(74) Attorney, Agent, or Firm—Birch, Stewart, Kolasch & Birch, LLP

(57) ABSTRACT

A motorcycle including a window screen capable of reducing a back pressure applied to a driver during running of the motorcycle. The motorcycle includes an upper cowl for covering an upper front portion of a vehicular body, and a window screen provided over the upper cowl in such a manner as to be tilted rearwardly. The window screen is moved almost along a tilt direction by a moving unit. The moving unit includes a guide portion providing on an upper cowl and extending along the tilt direction, a movable portion movably supported by the guide portion, a drive unit for moving the movable portion along the guide portion, and a coupling portion for coupling the window screen to the movable portion.

16 Claims, 25 Drawing Sheets

MOTORCYCLE WITH WINDOW SCREEN STRUCTURE

CROSS-REFERENCE TO RELATED APPLICATION

The present application claims priority under 35 U.S.C. §119 to Japanese Patent Application No. 2001-275479, filed Sep. 11, 2001, the entire contents of which are hereby incorporated by reference.

BACKGROUND OF THE INVENTION

1. Field of the Invention

The present invention relates to a motorcycle including a cowling for covering an upper front portion of a vehicular body, and a window screen provided over said cowling in such a manner as to be tilted toward the rear side of said vehicular body.

2. Description of Background Art

A motorcycle having a transparent window screen provided over a cowling for covering an upper front portion of the motorcycle body is known. During the running of these motorcycles, inconveniences often occur that the pressure on the rear side of the cowling becomes negative, and the window screen becomes cloudy. To cope with such inconveniences, an attempt has been made to provide a running wind inlet in part of the cowling or in a space between the cowling and the window screen. The purpose of this attempt is to feed running wind rearwardly of the cowling. For example, Japanese Patent Laid-open No. Hei 3-65483 has disclosed a technique in which a running wind inlet is provided between an upper front edge portion of a cowling and a lower edge portion of a tilt angle variable type window screen. The window screen disclosed in this document includes a swing arm that is connected to the window screen and is turnable around the lower end portion, and a drive unit such as an electric motor for turning the swing arm. With this configuration, the tilt angle of the window screen is changed by the swing arm driven by the electric motor. The tilt angle of the window screen is set on the basis of a running speed, by a driver, so as to prevent the driver from being touched by running wind.

The above-described related art window screen for a motorcycle, however, has a problem. Since the window screen is configured such that the upper end thereof is turned around the lower end thereof, when the upper end is turned forwardly, a distance between the window screen and a driver becomes large. During running of the vehicle, the enlargement between the window screen and the driver tends to cause a negative pressure in a space between the window screen and the driver. As a result, a back pressure is applied to the driver in the direction from the rear side to the front side of the vehicular body. Such a back pressure may cause driving of the motorcycle to be uncomfortable.

SUMMARY AND OBJECTS OF THE INVENTION

In view of the foregoing, the present invention has been developed. An object of the present invention is to provide a motorcycle including a window screen which, during running of the vehicle, is capable of suppressing the running wind touching the driver, and therefore, is capable of reducing the back pressure applied to the driver.

To solve the above-described problem, according to the motorcycle of the present invention, a motorcycle is provided with a cowling for covering an upper front portion of a vehicular body, and a window screen provided over the cowling in such a manner as to be tilted as nearing the rear side of the vehicular body. The motorcycle further includes a moving unit for moving the window screen almost along a tilt direction.

According to the present invention, since the position of the window screen can be changed, the driver can be prevented from being touched by running wind by changing the position of the window screen depending on a running speed. Also, since the window screen is moved almost along the tilt direction by the moving unit, the window screen can be moved without any enlargement of a distance between the window screen and the driver. As a result, even if the position of the window screen and the running speed are changed, it is possible to suppress a back pressure applied to the driver.

In this motorcycle, preferably, the moving unit includes a guide portion provided on the cowling in such a manner as to extend along the tilt direction, a movable portion movably supported by the guide portion, a drive unit for moving the movable portion along the guide portion, and a coupling portion for coupling the window screen to the movable portion. With this configuration, the window screen can be moved along the guide portion on the basis of a driving force of the drive unit.

In this motorcycle, preferably, the coupling portion includes a first member fixed to the movable portion in such a manner as to extend along the tilt direction, and a second member fixed to the window screen. Further, the first member has a fixing portion capable of fixing the second member to the first member at one of a plurality of different positions in the tilt direction. With this configuration, the position of the window screen can be changed by manually changing the fixing position of the second member to the first member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following description, the directions "front", "rear", "left", "right", and the like are based on the running direction of the vehicular body.

Figure 1:
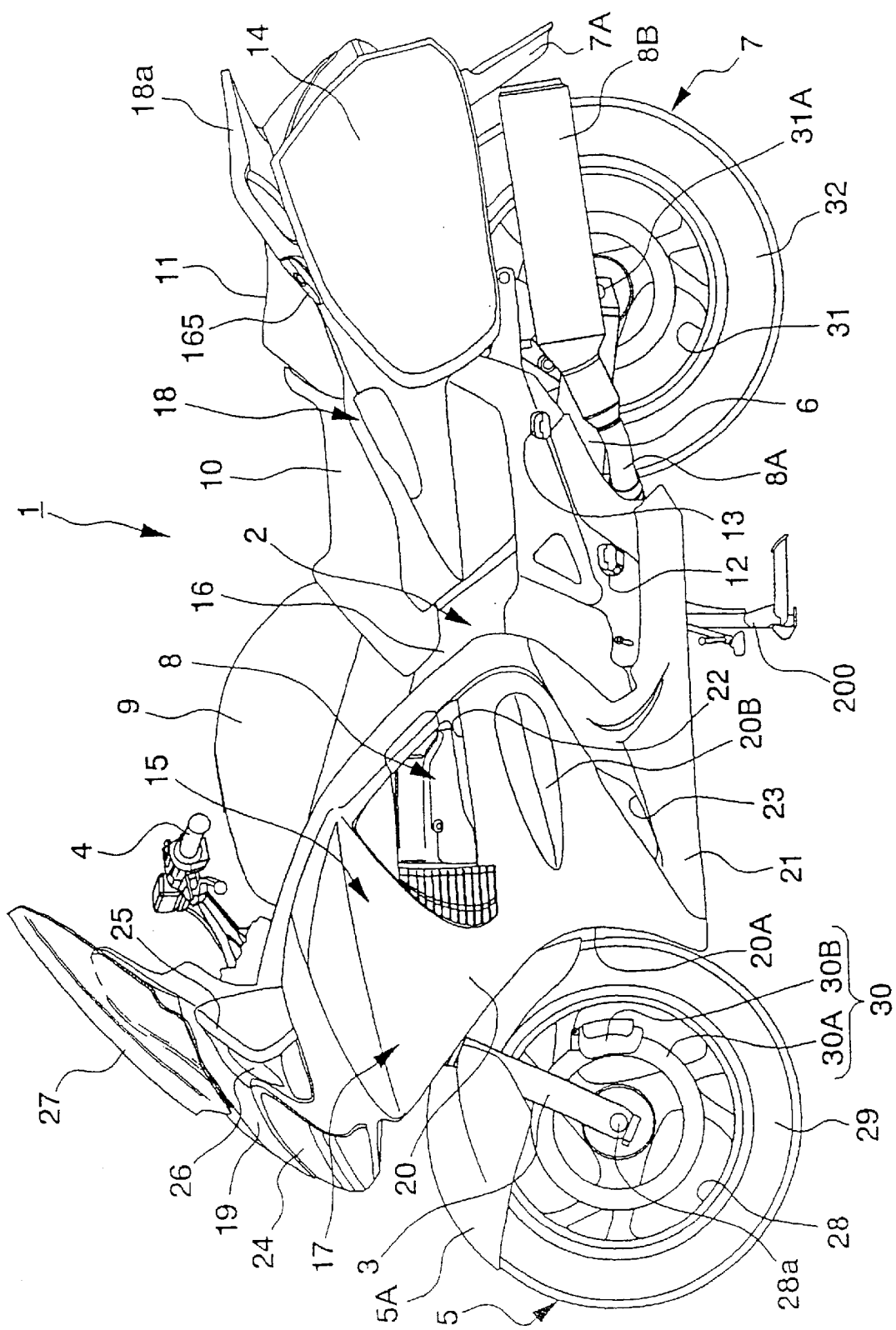
FIG. 1 is a schematic general side view showing one embodiment of a motorcycle of the present invention.

Referring to FIG. 1, there is shown a motorcycle 1 including a body frame 2. A pair of left and right front forked portions 3 are turnably supported by a front end portion of the body frame 2. A steering handlebar 4 is mounted to upper end portions of the front forked portions 3, and a front wheel 5 is rotatably supported by the front forked portions 3. A rear fork (swing arm) 6 is swingably supported by the body frame 2, and a rear wheel 7 is rotatably supported by rear end portions of the rear fork 6. An engine 8 is supported by the body frame 2, and a fuel tank 9 is disposed on an upper portion of the body frame 2. A driver's seat 10 is provided at the back of the fuel tank 9, and a passenger's seat (pillion seat) 11 is provided at the back of the driver's seat 10. Driver's steps 12 and passenger's steps 13 are provided on the left and right sides of the vehicular body. Side trunks 14 are mounted on the left and right sides of a rear portion of the vehicular body. A cowling 15 is provided for covering nearly the whole of the vehicular body. It is to be noted that in FIG. 1, the motorcycle 1 is depicted as being supported by a stand 200.

An exhaust pipe 8A is connected to each cylinder portion of the engine 8. The exhaust pipe 8A, which extends downwardly, is bent at a position under the engine 8, and is connected to a muffler 8B disposed at the back of the engine 8.

The cowling 15 includes a front cowl 17 and a rear cowl 18. The front cowl 17 covers a front portion of the vehicular body, with its upper end face extending along main frames 16 of the body frame 2. The rear cowl 18 covers a portion, located under the seats 10 and 11, on the rear side of the vehicular body. The front cowl 17 is composed of an upper cowl 19 provided at the front end of the vehicular body, a middle cowl 20 for covering side portions of the engine 8, and an under cowl 21 for covering a lower portion of the engine 8 (lower portion of the exhaust pipe 8A).

On each of both sides of the middle cowl 20 of the front cowl 17, a first opening portion 22 is formed in a central portion in the height direction, and a second opening portion 23 is formed under the first opening portion 22. Air (running wind) flows in or out of the cowling 15 via the first and second opening portions 22 and 23. A head cover of the engine 8 is exposed from the first opening portion 22. A running wind inlet 20A through which running wind flows in the cowling 15 is provided in a front portion of the middle cowl 20 of the front cowl 17. Swelled panels 20B are provided on the left and right sides of a lower portion of the middle cowl 20 in such a manner as to be swelled outwardly therefrom.

Figure 2:
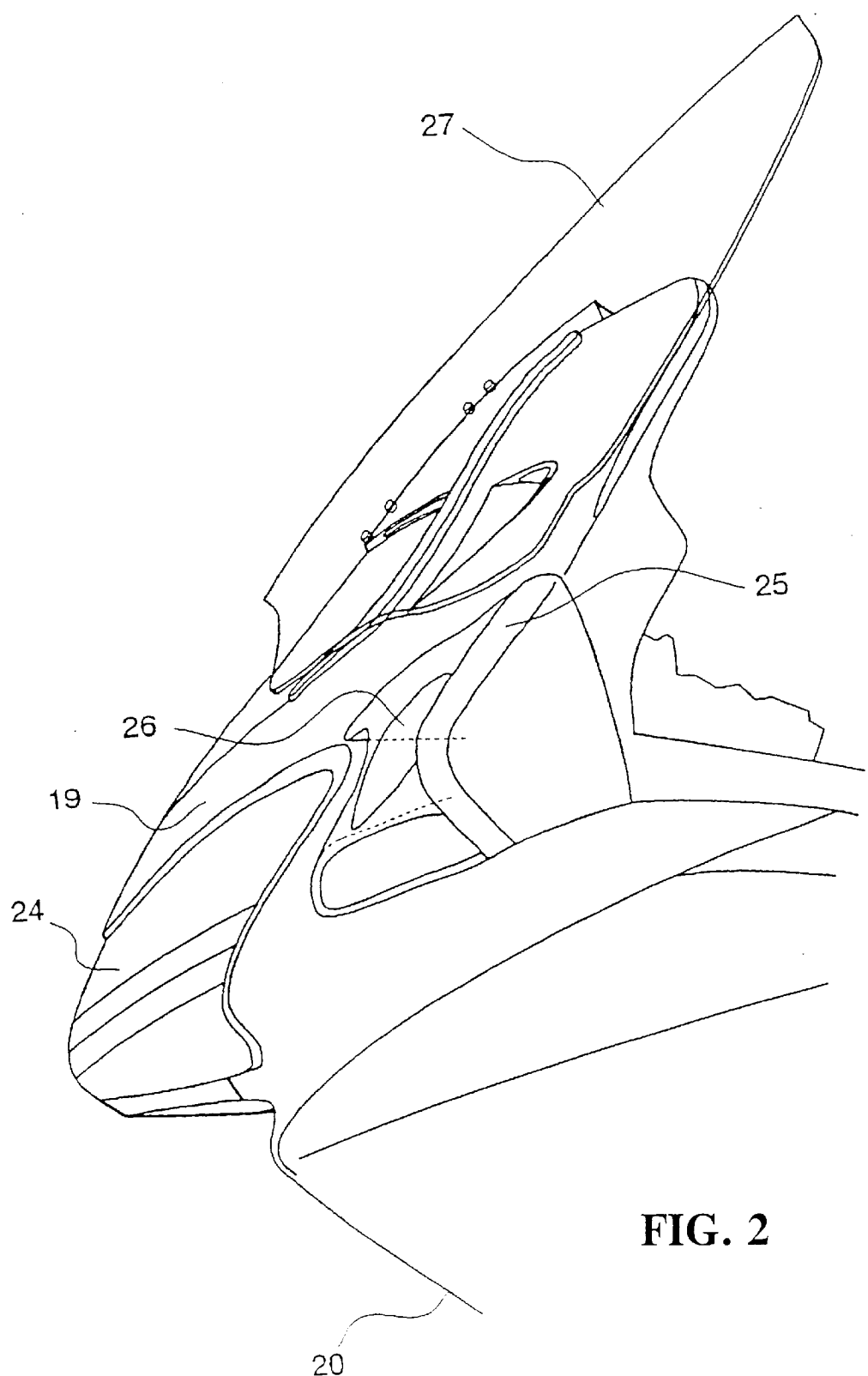
FIG. 2 is an enlarged view of an essential portion of FIG. 1, showing a headlamp and its neighborhood.
Figure 3:
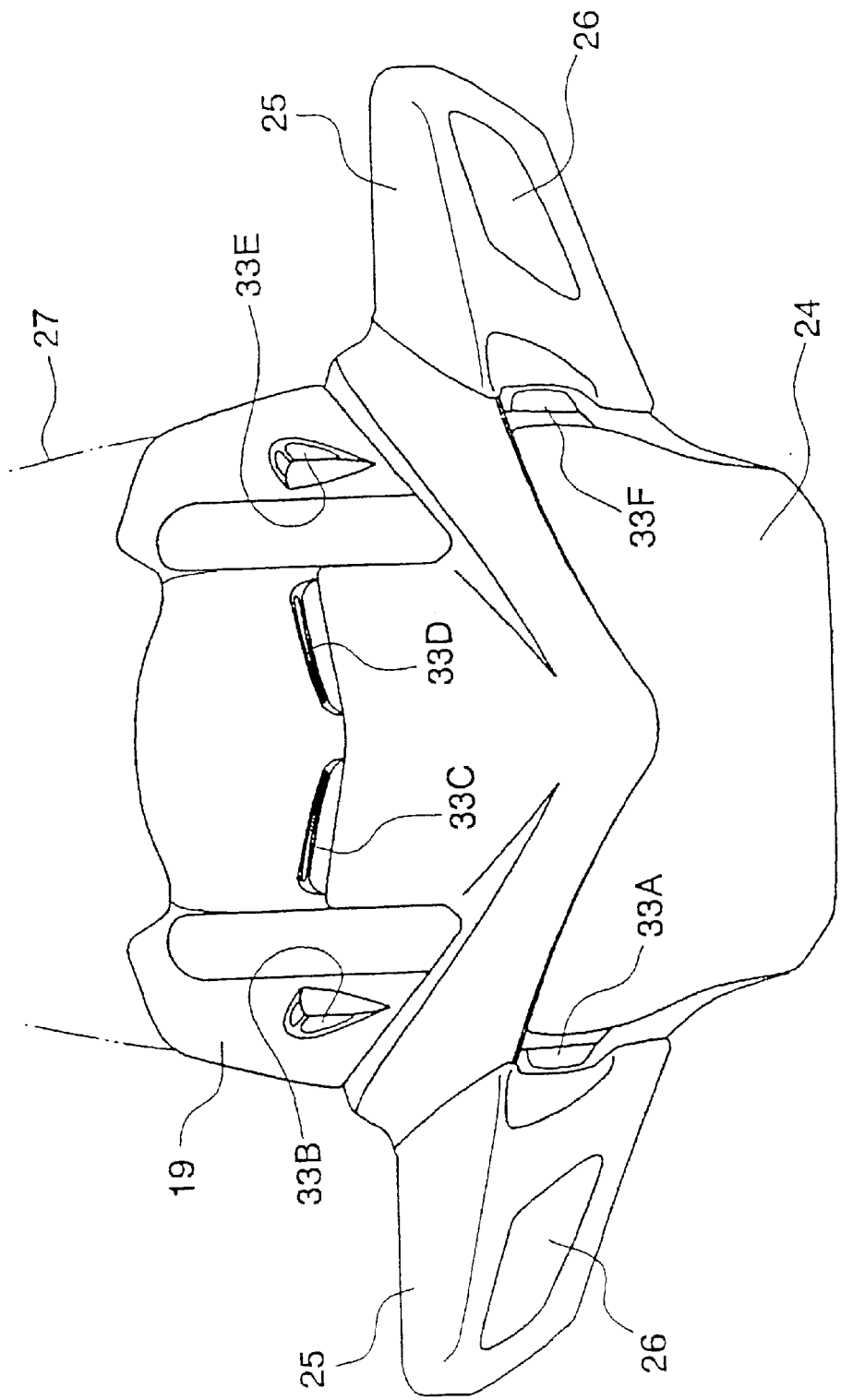
FIG. 3 is a front view of the headlamp and its neighborhood.

A meter unit (not shown) on which a speed meter, an engine speed meter, and the like are mounted is disposed inside the upper cowl 19. As shown in FIGS. 1, 2 and 3, a headlamp 24 is provided on the front surface of the upper cowl 19, and rear view mirror covers 25 are provided on both the side surfaces of the upper cowl 19 in such a manner as to be swelled therefrom. A rear view mirror is provided in each of the rear view mirror covers 25. The rear view mirror cover 25 is mounted to the front cowl 17 by engaging a projection formed on the rear view mirror cover 25 in an engagement recess formed in the side surface of the front cowl 17. A direction indicator 26 is provided in front of each of the rear view mirror covers 25. A window screen 27 for front view, which is made from a transparent synthetic resin, is provided on an upper portion of the upper cowl 19.

As shown in FIG. 3, opening portions 33A to 33F for allowing the flow of air in or out of the upper cowl 19 therethrough are formed in the upper cowl 19. The opening portion 33A is located between the upper cowl 19 and the left rear view mirror cover 25 and the opening portion 33F is located between the upper cowl 19 and the right rear view mirror cover 25. The opening portions 33B and 33E are located on the left and right sides of an upper portion of the upper cowl 19, respectively. The opening portions 33C and 33D are located at an upper central portion of the upper cowl 19. The opening portions 33A to 33F function as wind guide ports for guiding running wind rearwardly of the cowl. A pressure in a space between the driver and the upper cowl 19 and window screen 27 is prevented from becoming negative by running wind fed rearwardly of the cowling.

The rear cowl 18 extends rearwardly from the underside of the seats 10 and 11. A tail portion 18a for covering a rear portion of the seat 11 is integrally provided on a rear portion of the rear cowl 18. A rear fender 7A for covering an upper rear portion of the rear wheel 7 is mounted at the rear end of the rear cowl 18.

The front wheel 5 includes a wheel 28 having at its axis an axle 28a, and a tire 29 mounted on the outer periphery of the wheel 28. The left and right sides of the axle 28a are supported by the lower ends of the front forked portions 3. A front fender 5A for covering the upper side of the front wheel 5 is mounted to the left and right front forked portions 3. A rotor 30A of a front disk brake device 30 is coaxially integrated to each of the left and right sides of the wheel 28 of the front wheel 5. The front disk brake device 30 has, on each of the left and right sides, the rotor 30A and a brake caliper 30B for clamping, in an operational state, the rotor 30A, thereby braking the rotation of the rotor 30A by a frictional force.

Like the front wheel 5, the rear wheel 7 has a wheel 31 heaving at its axis an axle 31A, and a tire 32 mounted on the outer periphery of the wheel 31. The axle 31A is supported in a cantilever manner by the rear ends of the rear fork 6, to be thus swingable integrally with the rear fork 6. Like the front disk brake device 30 for the front wheel 5, a rear disk brake device having rotors and brake calipers is provided for the rear wheel 7. The description of the rear disk brake device, having the same basic configuration as that of the front disk brake device 30, is herein omitted.

Figure 4:
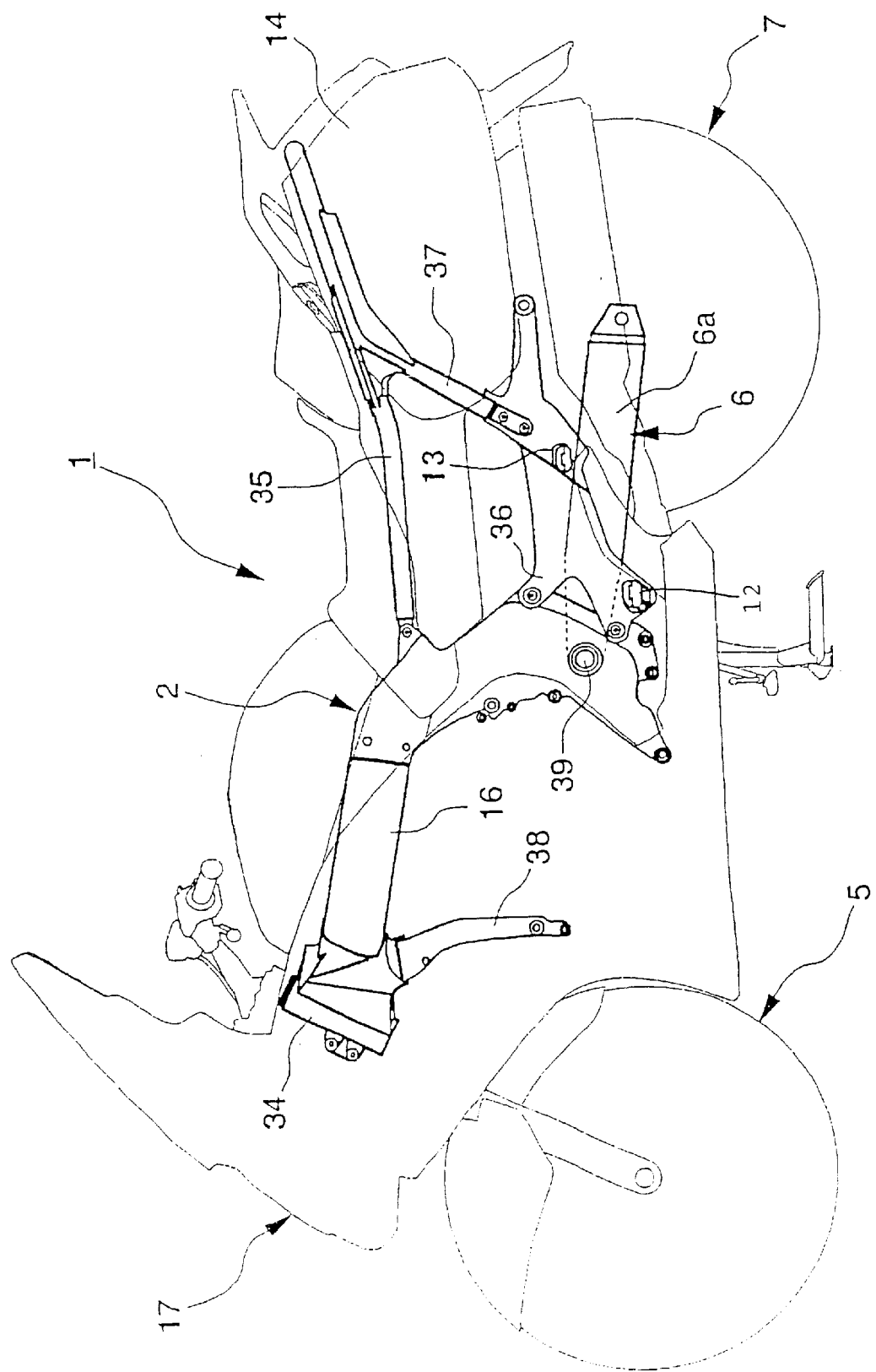
FIG. 4 is a side view of a body frame of the motorcycle of the present invention.
Figure 5:
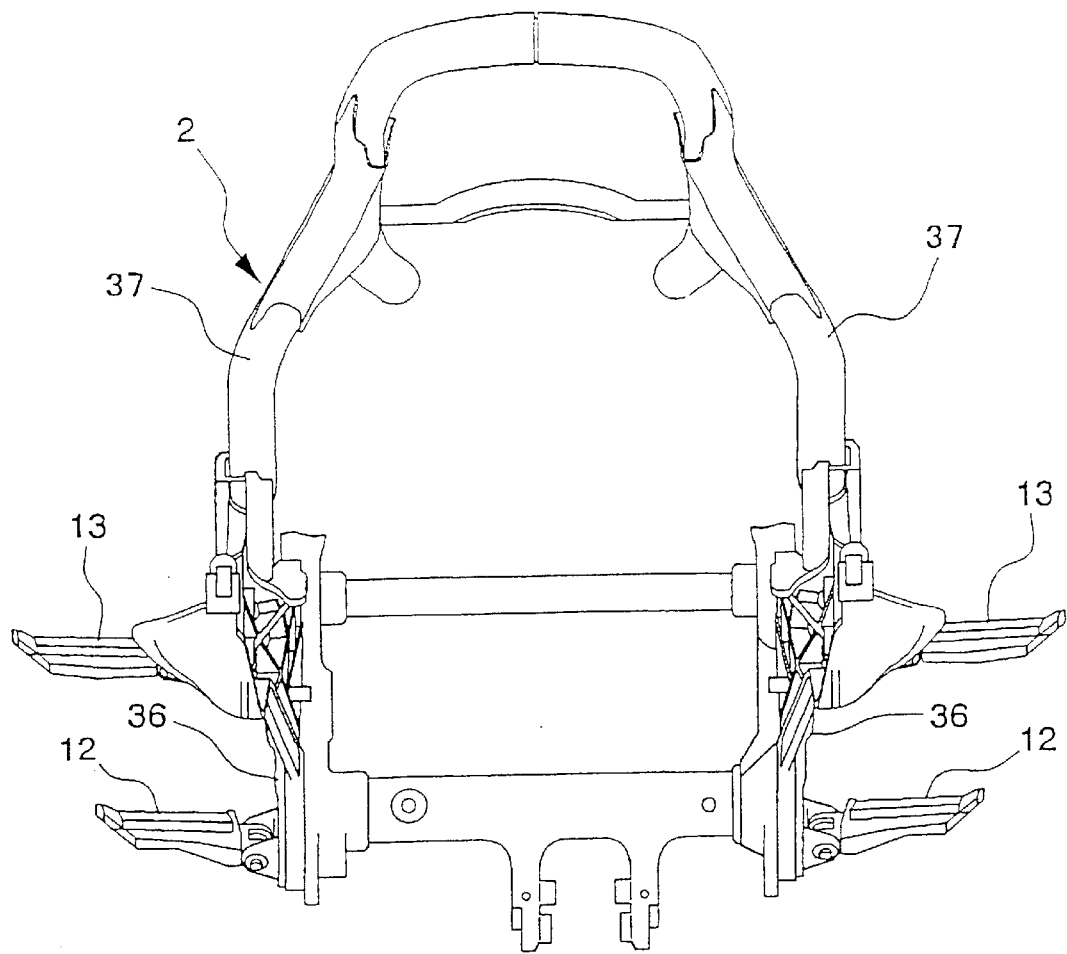
FIG. 5 is a front view of the body frame.
Figure 6:
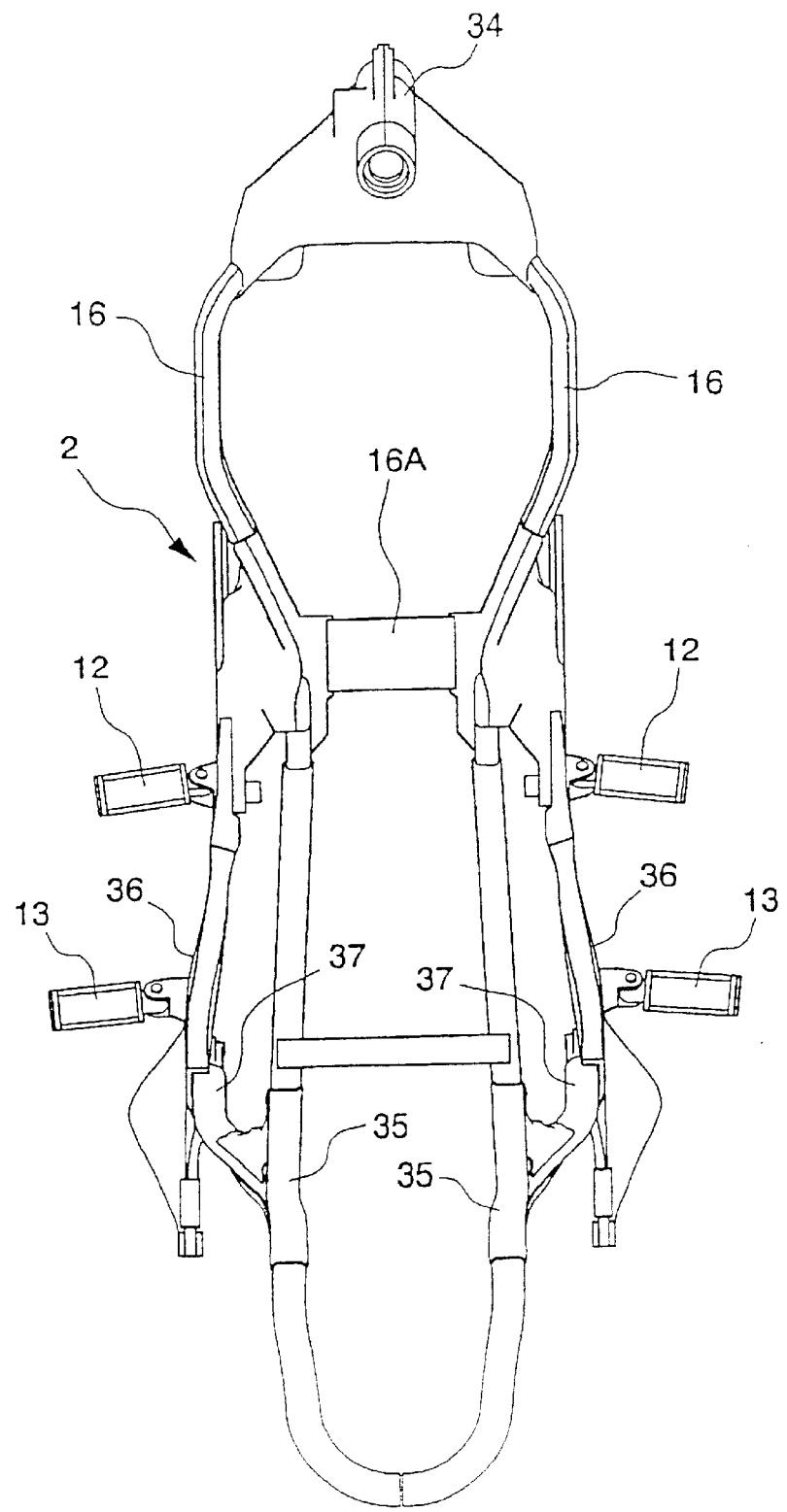
FIG. 6 is a top view of the body frame.

FIGS. 4, 5 and 6 are views showing the body frame 2, wherein FIG. 4 is a side view of the body frame, FIG. 5 is a front view of the body frame 2, and FIG. 6 is a top view of the body frame 2.

As shown in FIG. 4, the body frame 2 includes a head pipe 34 provided at the front end of the body frame 2, two main frames 16 extending rearwardly, obliquely downwardly from the head pipe 34, two seat frames (first frames) 35 extending rearwardly from upper portions of the main frames 16, two step plates (second frames) 36 extending rearwardly from lower portions of the main frames 16, and two rear frames (third frames) 37 for connecting, on the rear side of the vehicular body, the seat frames 35 and the step plates 36 to each other.

The head pipe 34 steerably supports the front forked portions 3 by means of which the front wheel 5 is supported. A stay is mounted to the head pipe 34 in such a manner as to extend forwardly therefrom. The stay supports the above-described meter unit, on which a speed meter, an engine speed meter, and the like are provided. Brackets (not shown) for supporting the front cowl 17 are connected to the stay mounted to the head pipe 34.

As shown in FIGS. 4, 5 and 6, the main frames 16 provided as a pair of left and right frames are branched leftwardly and rightwardly from the head pipe 34 in such a manner as to extend rearwardly, obliquely downwardly therefrom. The main frame 16 is configured as a hollow member having a square shape in cross-section, which member is made from a metal such as aluminum. The pair of left and right main frames 16 are connected to each other by means of a connection frame 16A. The fuel tank 9 is supported on the upper portions of the main frames 16. The body frame 2 also includes engine hangers 38, which are formed between the head pipe 34 and the main frames 16 in such a manner as to extend downwardly therefrom. The main frames 16 support the engine 8 via these engine hangers 38.

The seat frames 35 provided as a pair of left and right frames extend rearwardly from the upper portions of the pair of left and right main frames 16. The pair of left and right seat frames 35 for supporting the driver's seat 10 and the passenger's seat 11, which extend to the vicinity of the tail portion 18a, are connected to each other on the rear end side. Like the main frame 16, the seat frame 35 is configured as a hollow member having a square shape in cross-section, which member is made from a metal such as aluminum.

The step plates 36 provided as a pair of left and right frames extend rearwardly from the lower portions of the pair of left and right main frames 16. As shown in FIG. 6, the step plates 36 project outwardly from the seat frames 35. The driver's steps 12 are provided on the front side of a front portion of each of the step plates 36, and the passenger's steps 13 are provided behind the outer side of the pivot plates 36. Thus, the step plates 36 configured as rigid members function as step holders. Like the main frame 16, the step plates 36 are configured as a hollow member having a square shape in cross-section, which member is made from a metal such as aluminum.

The rear fork 6 for swingably supporting the rear wheel 7 is connected to front portions of the step plates 36. The rear fork 6 is composed of a pair of left and right forked portions 6a extending rearwardly from a base 39 at the front end of the rear fork 6. The base 39 is turnably supported by the main frames 16, whereby the forked portions 6a is vertically swingable around the base 39.

The rear frames 37 provided as a pair of left and right frames are disposed such that the upper ends thereof are connected to approximately center portions of the seat frames 35 in the longitudinal direction of the vehicular body and the lower ends thereof are connected to rear portions of the step plates 36. The rear frame 37 is also configured as a hollow member having a square shape in cross-section, which member is made from a metal such as aluminum.

As shown in FIG. 4, the body frame 2 is built such that the main frames 16, the seat frames 35, the step frames 36, and the rear frames 37 form a space having an approximately square shape in a side view. More specifically, the body frame 2 has an equal-leg trapezoidal shape in a side view, in which the lower side (step plate 36 side) is shorter than the upper side (seat frame 35 side). The main frames 16, the seat frames 35, the step frames 36, and the rear frames 37, which are connected to each other, function as reinforcing members for keeping the strength of the entire vehicular body.

The body frame 2 is composed of the main frames 16, the seat frames 35 and the step frames 36 extending rearwardly from the upper and lower portions of the main frames 16, and the rear frames 37 for connecting the seat frames 35 and the step frames 36 to each other. As such, the body frame 2 is built such that the space surrounded by these frames has, as described above, an approximately square shape in a side view. Accordingly, the body frame 2 can exhibit a high rigidity without the need of using other reinforcing members. The elimination of the need of using any reinforcing member for the body frame 2 reduces the number of members required for the motorcycle 1. As a result, it is possible to realize the reduction in cost and to effectively use the internal space inside the frame components of the body frame 2.

Figure 7:
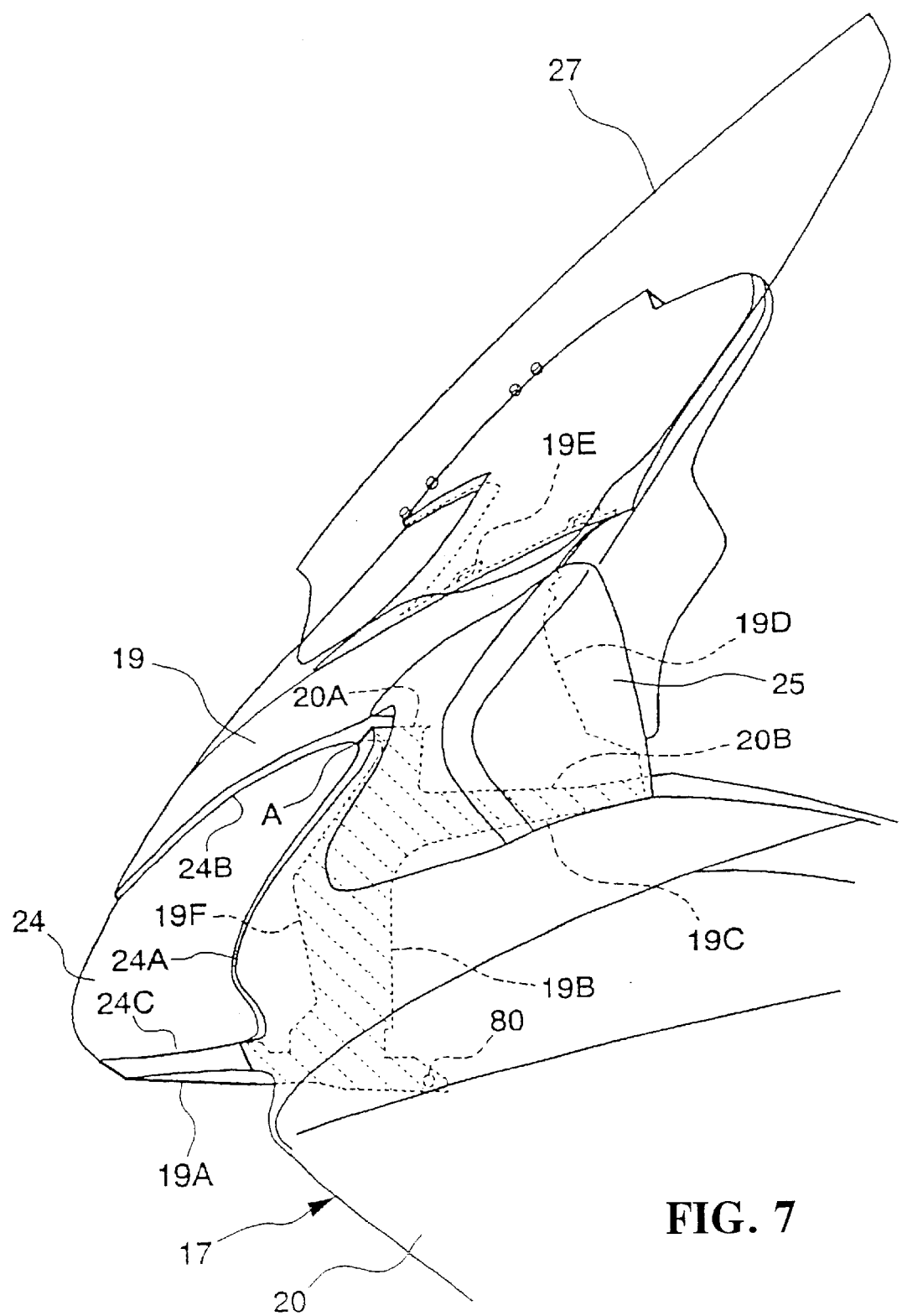
FIG. 7 is an enlarged side view a joint portion between an upper cowl and a middle cowl and its neighborhood.

FIG. 7 is an enlarged side view of a joint between the upper cowl (upper side cowl) 19 and the middle cowl (lower side cowl) 20 of the front cowl 17, and its neighborhood.

The cowling 15 is mounted to the body frame 2. An upper portion of the front cowl 17 is supported by brackets (not shown) connected to the body frame 2. The brackets are connected to stays extending forwardly from the main frames 16 or the head pipe 34 of the body frame 2.

As described above, the front cowl 17 for covering the front portion of the vehicular body has the upper cowl (upper side cowl) 19 provided at the front end of the vehicular body, the middle cowl (lower side cowl) 20 disposed under the upper cowl 19 and connected to the upper cowl 19, and the under cowl 21 disposed under the middle cowl 20 and connected to the middle cowl 20. These cowl members (the upper cowl 19, middle cowl 20, and under cowl 21) are connected to each other, to form the front cowl 17. The rear view mirror covers (covering members) 25 are mounted to the side surfaces of the upper portion of the front cowl 17 in such a manner as to be swelled therefrom. A rear view mirror is contained in each of the rear view mirror covers 25.

An upper portion of the middle cowl 20 is formed so as to extend up to the vicinity of the headlamp 24 provided on the front surface of the upper cowl 19. The contour of the upper portion of the middle cowl 20 is defined by the front end curved along a side end 24A of the headlamp 24, and a projecting portion 20A and an upper end portion 20B. The projecting portion 20A extends slightly rearwardly from a portion (shown by character A in FIG. 7) near the upper end of the headlamp 24 and further extends downwardly. The upper end portion 20B extends rearwardly from the projecting portion 20A substantially in the horizontal direction. It is to be noted that the position of the upper end portion 20B in the height direction is set such that the upper end portion 20B is located on the shortest line crossing the front cowl 17 in the longitudinal direction of the vehicular body.

The upper cowl 19 is partially overlapped to the middle cowl 20. The overlapped portion of the upper cowl 19 is located under the middle cowl 20, that is, located inwardly of the cowling. As shown in FIG. 7, the contour of the upper cowl 19 is defined by the front end curved along an upper end 24B and a lower end 24C of the headlamp 24, and a lower end portion 19A, a first rear end portion 19B, a horizontal end portion 19C, a second rear end portion 19D, a connecting portion 19E, and a front end portion 19F. The lower end portion 19A extends rearwardly, and is connected at its rear end to the middle cowl 20 by means of a connecting member 80. The first rear end portion 19B extends upwardly from the rear end of the lower end portion 19A. The horizontal end portion 19C, which is bent rearwardly from the upper end of the first rear end portion 19B, extends nearly in parallel to the upper end portion 20B of the middle cowl 20. The second rear end portion 19D extends upwardly from the rear end of the horizontal end portion 19C. The connecting portion 19E is connected to the window screen 27 at the upper end of the second rear end portion 19D. The front end portion 19F is formed in front of the first rear end portion 19B. The hatched area in FIG. 7, including an area between the first rear end portion 19B and the front end portion 19F, is overlapped to the middle cowl 20.

The upper cowl 19 is connected to the middle cowl 20 in such a manner as to be partially overlapped, from below, to the middle cowl 20. To be more specific, the specific area hatched in FIG. 7 of the upper cowl 19 is overlapped, from below, to the corresponding area of the middle cowl 20. In the state before the rear view mirror cover 25 is mounted, therefore, of the connected portion (overlapped area) between the upper cowl 19 and the middle cowl 20, only the end faces of the projecting portion 20A and the upper end portion 20B of the middle cowl 20 are exposed to the outside.

The rear view mirror cover (covering member) 25 is mounted outside the connected portion (overlapped area hatched in FIG. 7) between the upper cowl 19 and the middle cowl 20 in such a manner as to cover the exposed edges of the connected portion between the upper cowl 19 and the middle cowl 20, that is, to cover the end faces of the projecting portion 20A and the upper end portion 20B of the middle cowl 20. Accordingly, when the rear view mirror cover 25 is mounted, the exposed edges of the connected portion between the upper cowl 19 and the middle cowl 20 (end faces of the projecting portion 20A and the upper end portion 20B) in the state before the rear view mirror cover 25 is mounted are contained in and covered with the rear view mirror cover 25. In this case, since the projecting portion 20A and the upper end portion 20B are, as described above, formed in a section positioned along the shortest line crossing the front cowl 17 in the longitudinal direction of the vehicular body, the end faces of the projecting portion 20A and the upper end portion 20B can be sufficiently covered with the rear view mirror cover 25.

A procedure of connecting the upper cowl 19 and the middle cowl 20 to each other will be described below.

The upper cowl 19 and the middle cowl 20 are mounted to the body frame 2 as follows. The upper cowl 19 is mounted to stays and brackets connected to the head pipe 34 and the main frames 16 of the body frame 2. The middle cowl 20 is mounted to the upper cowl 19 thus mounted to the body frame 2 in such a manner as to be partially overlapped thereto, and is connected to the upper cowl 19 by using the connecting member 80.

After the middle cowl 20 is connected to the upper cowl 19, the rear view mirror cover 25 is mounted to the front cowl 17 in such a manner as to cover the exposed edges of the connected portion between the upper cowl 19 and the middle cowl 20, that is, the end faces of the projecting portion 20A and the upper end portion 20B of the middle cowl 20. The rear view mirror cover 25 is connected to the front cowl 17 by engaging projecting portions (not shown) in engagement recesses (engagement portions) provided in the outer surfaces of the upper cowl 19 and the middle cowl 20. Thus, by mounting the rear view mirror, cover 25 to the front cowl 17, the exposed edges of the connected portion (overlapped portion) between the upper cowl 19 and the middle cowl 20, that is, the end faces of the projecting portion 20A and the upper end portion 20B of the middle cowl 20 are covered with the rear view mirror cover 25.

Since the rear view mirror cover 25 as the covering member is mounted outside the connected portion between the upper cowl 19 and the middle cowl 20 in such a manner as to partially cover the connected portion, the exposed end faces of the middle cowl 20 can be covered with the rear view mirror cover 25, to enhance the appearance characteristic of the cowling. Also, since the rear view mirror cover 25 is mounted to the connected portion between the upper cowl 19 and the middle cowl 20, it is possible to shorten the length of the connected portion. This configuration also reduces the numbers of connecting members and the connected points required for connecting the upper cowl 19 and the middle cowl 20 to each other, thus simplifying the work to connect these parts and reducing the cost of the connection.

Figure 14:
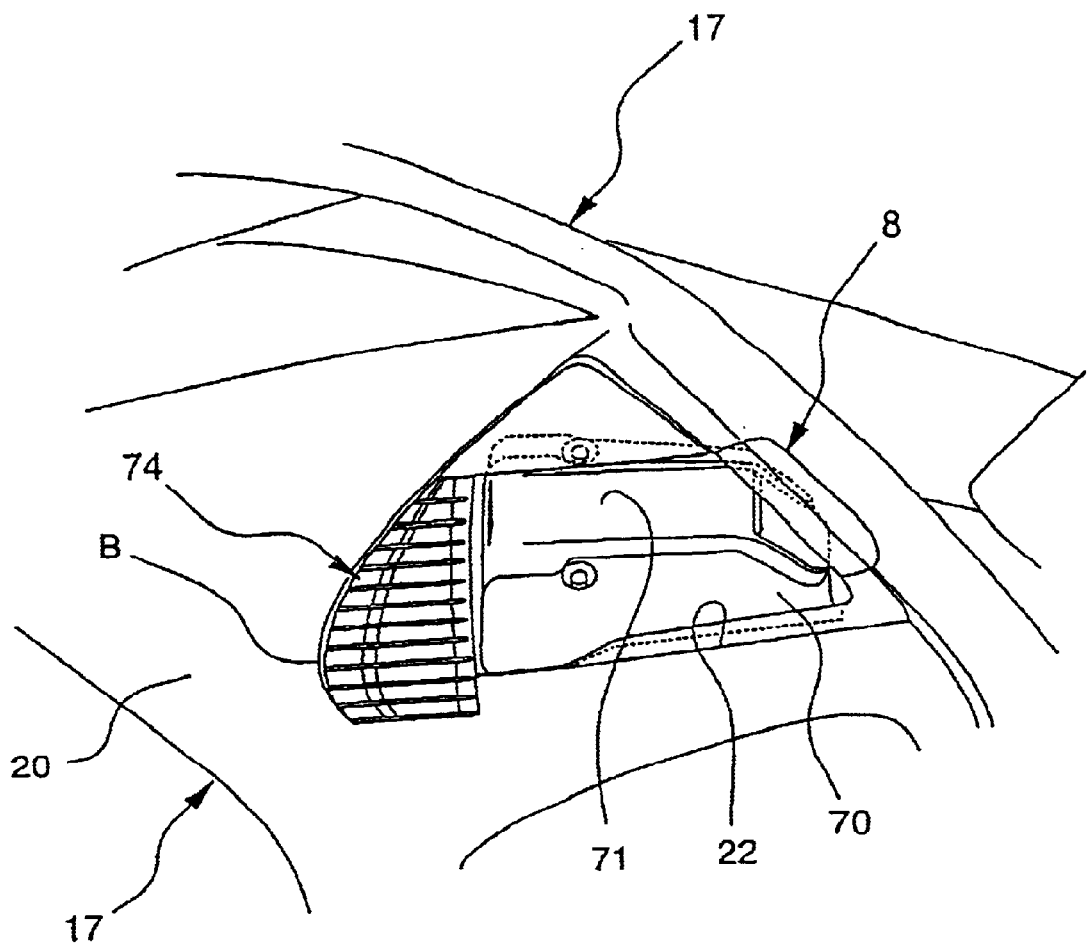
FIG. 14 is an enlarged side view showing a first opening portion of a cowling and its neighborhood.

The first opening portion 22 provided in the middle cowl 20 will be described with reference to FIGS. 14 and 15. FIG. 14 is an enlarged side view of the first opening portion 22 and its neighborhood, and FIG. 15 is a sectional view, seen from rear of the vehicular body, showing the first opening portion 22 and its neighborhood shown in FIG. 14.

As described above, the front cowl 17 for covering the surroundings of the engine 8 has the under cowl 21 for covering the underside of the engine 8 or the underside of the exhaust pipe 8A connected to the engine 8, and the middle cowl 20 disposed on the upper side of the under cowl 21 and connected to the under cowl 21. The middle cowl 20 is disposed so as to cover both the sides of the engine 8.

As shown in FIG. 14, the first opening portion 22 for allowing the flow of air (running wind) in or out of the cowling is, as described above, formed in each of the side portions of the middle cowl 20. An engine head cover 70 of the engine 8 is exposed from the first opening portion 22. A protective member 71 for protecting the engine head cover 70 is mounted to an exposed portion of the engine head cover 70. Accordingly, the engine head cover 70 mounted with the protective member 71 is exposed from the first opening portion 22. In addition, the protective member 71 is removably mounted to the engine head cover 70, and the work of mounting or dismounting the protective member 71 to or from the engine head cover 70 is performed through the first opening portion 22.

Figure 15:
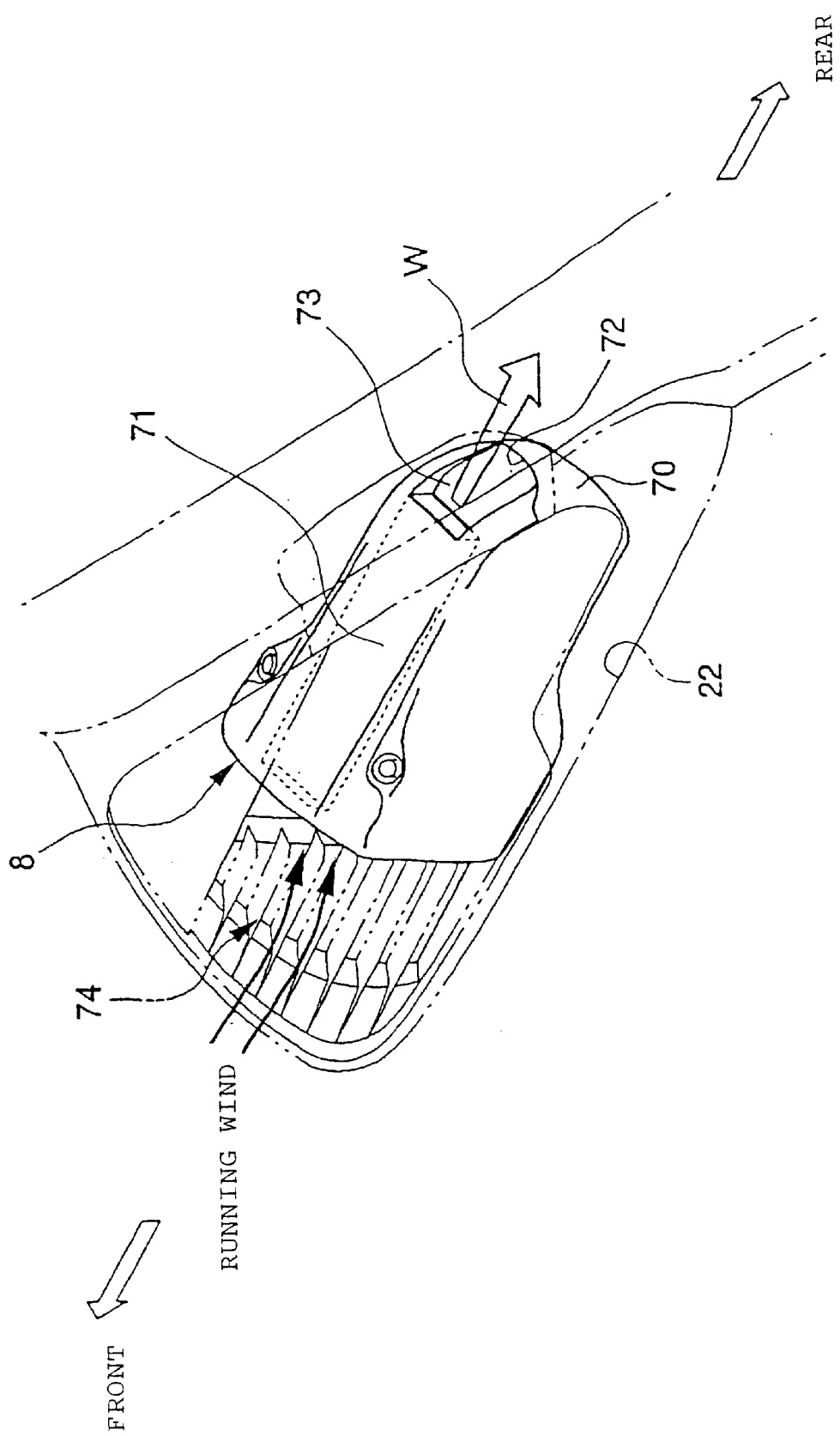
FIG. 15 is a rear view of the first opening portion shown in FIG. 14.

As shown in FIG. 15, a recess 72 extending in the longitudinal direction of the vehicular body is formed in an outer surface of the engine head cover 70. A passage 73 allowing the flow or air therethrough is formed between the engine head cover 70 and the plate-like protective member 71 mounted to the outer surface of the engine head cover 70 in such a manner as to extend in the longitudinal direction of the vehicular body.

A louver (flow changing device) 74 is provided in front of the first opening portion 22. The louver 74 is disposed so as to extend longer in the longitudinal direction of the vehicular body, and has a plurality of slit-like passages extending in parallel to the vertical direction of the vehicular body. The shapes and directions of the passages of the louver 74 are set such that the louver 74 changes the flow of running wind fed from the outside of the cowling in the direction toward the engine head cover 70. The entire shape of the louver 74 is curved along a front side shape of the first opening portion 22. To be more specific, the louver 74 is swelled forwardly, upwardly in a region from the lower side to a position (point B in FIG. 14) slightly lower than a central portion in the height direction, and is tilted rearwardly, upwardly in a region from the position (point B) to the upper side. The size of the louver 74 in the height direction is larger than th of the engine head cover 70.

The louver 74 is disposed at least in front of the engine head cover 70 and the protective member 71 exposed from the first opening portion 22 in such a manner as to partially cover the front side of the first opening portion 22. In other words, the engine head cover 70 is disposed at the back of the louver 74.

The flow of running wind in the vicinity of the first opening portion 22 during running of the motorcycle 1 will be described below.

During running of the motorcycle 1, running wind is led into the cowling through the running wind inlet 20A provided in the front portion of the middle cowl 20 and the first opening portions 22 and the second opening portions 23 provided in the side portions of the middle cowl 20. With respect to the running wind led into the cowling through each of the first opening portions 22, the flow of the running wind is changed by the louver 74 and is led into the cowling. Since the shapes and directions of the slit-shaped passages of the louver 74 are, as described above, previously set to lead the running wind toward the engine head cover 70, the running wind led into the first opening portion 22 via the louver 74 is fed to the engine head cover 70.

At this time, the louver 74 is previously set to allow the running wind to flow toward the passage 73 formed between the engine head cover 70 and the protective member 71. Accordingly, the running wind led into the first opening portion 22 via the louver 74 passes through the passage 73 as shown by an arrow W in FIG. 15, and flows out of the rear side of the passage 73. The running wind passing through the passage 73 direct cools the engine head cover 70.

According to this embodiment, the first opening portions 22 are provided in the side portions of the front cowl 17 provided so as to cover the surroundings of the engine 8 and the louver 74 for changing the flow of running wind in the direction toward the engine head cover 70 is provided at part of each of the first opening portions 22. As a result, running wind can be fed with certainly to the engine head cover 70. As a result, the engine head cover 70 can be effectively cooled by the running wind fed into each first opening portion 22 via the louver 74. In this case, since the engine head cover 70 is exposed from the first opening portion 22, the cooling effect can be further enhanced. As described, the louver 74 having the plurality of slit-shaped passages, which is a wind guide device for feeding running wind to the engine head cover 70, is provided only at part, on the front side, of the first opening portion 22. Thus, it is possible to simplify the configuration of the wind guide device. Since the engine head cover 70 is disposed at the back of the louver 74, the running wind led into the first opening portion 22 via the louver 74 can be efficiently, uniformly fed to the engine head cover 70, with a result that it is possible to enhance the effect of cooling the engine head cover 70 with running wind. Further, since running wind is directly led, by the louver 74, into the passage 73 between the engine head cover 70 and the protective member 71, it is possible to further enhance the effect of cooling the engine head cover 70 with running wind.

Figure 16:
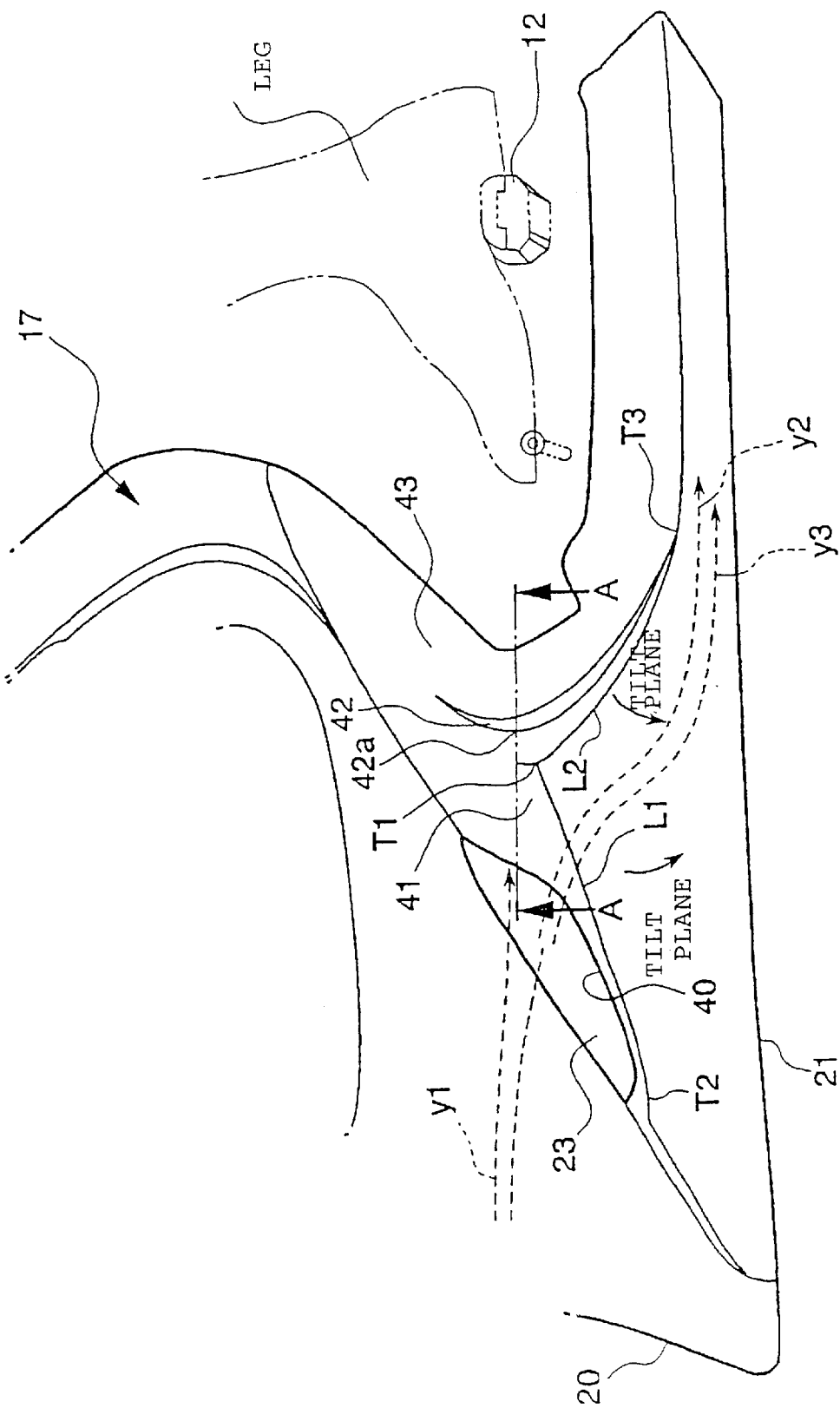
FIG. 16 is an enlarged side view of a second opening portion of the cowling and its neighborhood.

The second opening portion 23 provided on each of the lower side portions of the front cowl 17 will be described with reference to FIGS. 16 and 17. FIG. 16 is an enlarged side view of the second opening portion and its neighborhood, and FIG. 17 is a sectional view taken on line A—A of FIG. 16.

As described above, the front cowl 17 provided so as to cover the surroundings of the engine 8 has the under cowl (lower side cowling) 21 for covering the underside of the engine 8 or the underside of the exhaust pipe 8A connected to the engine 8, and the middle cowl (upper side cowling) 20 disposed on the upper side of the under cowl 21 and connected to the under cowl 21.

As shown in FIG. 16, the joint plane of the under cowl 21 to the middle cowl 20 is tilted upwardly from the lower side as nearing to the rear side of the vehicular body. A recess 40, which is recessed with respect to the middle cowl 20, is formed in the joint plane of the under cowl 21 to the middle cowl 20 at an approximately central portion. By joining the middle cowl 20 to the under cowl 21 having the recess 40, the second opening portion 23 having a slot shape corresponding to the recess 40 is formed at the joint plane therebetween.

Figure 17:
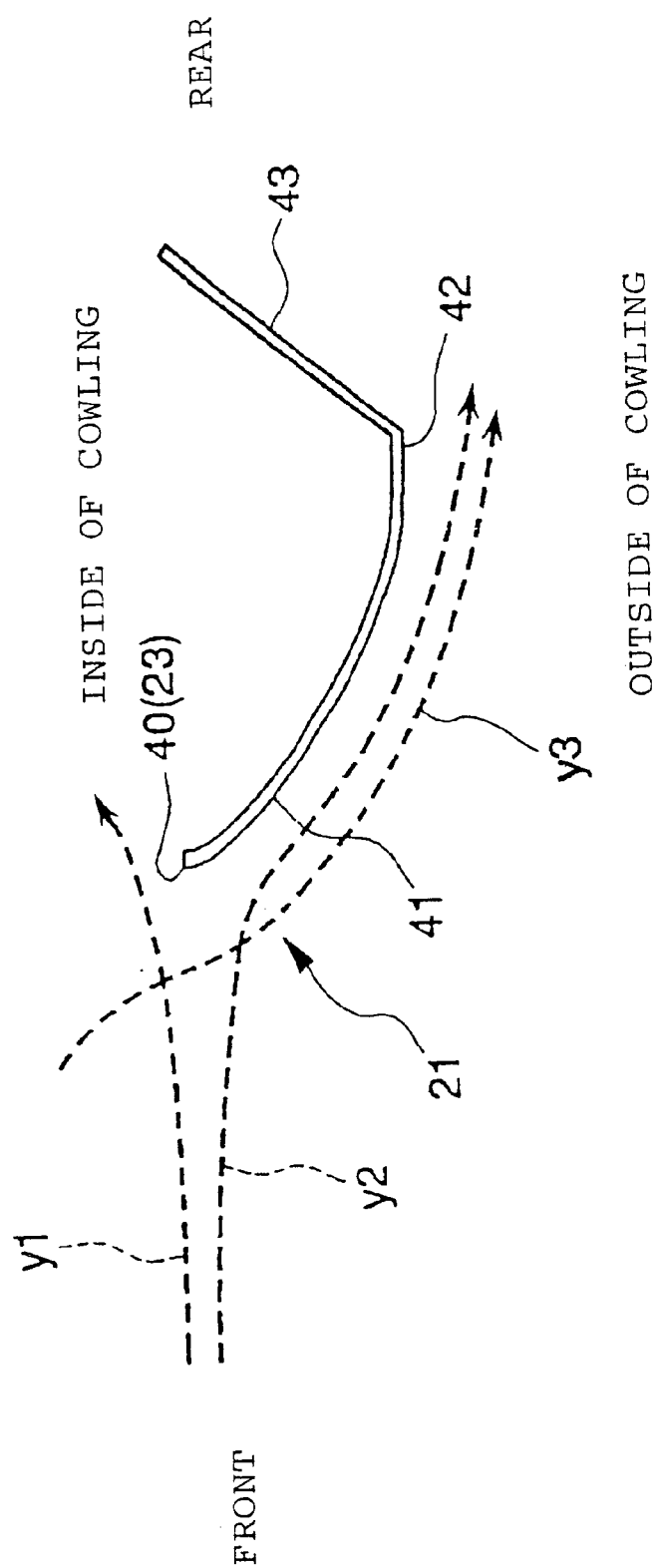
FIG. 17 is a sectional view taken on line A—A of FIG. 16.

As shown in FIGS. 16 and 17, the under cowl 21 has a swelled portion continuous to the recess 40. The swelled portion is gradually swelled toward the outside of the cowling (that is, toward the outside of the vehicular body) as nearing from the recess 40 to the rear side of the vehicular body. Such a swelled portion formed on the front side of the under cowl 21 is taken as a curved portion 41. As shown in FIG. 16, the curved portion 41 is formed with a central portion thereof swelled outwardly.

The under cowl 21 has a tilt portion 43 at the back of the curved portion 41. The tilt portion 43, which is continuous to the curved portion 41, is tilted toward the inside of the cowling (that is, inside of the vehicular body) via a top portion 42. As shown in FIG. 17, the tilt portion 43 is formed into an approximately flat plane, and a rear end portion of the tilt portion 43 is taken as a rear end portion of the under cowl 21.

As shown in FIG. 16, the top portion 42 between the curved portion 41 and the tilt portion 43, that is, a ridge between the curved portion 41 and the tilt portion 43 is formed into an arc shape (crescent shape) swelled forwardly of the vehicular body in a side view. The curved portion 41 is tilted toward the inside of the cowling (that is, the inside of the vehicular body) as nearing from a point T1 in the vicinity of a leading end 42a of the top portion (ridge) 42 of the curved portion 41 (see FIG. 16) to the lower side of the vehicular body. In other words, the under cowl 21 is tilted so as to be bent inside the vehicular body with a line L1 connecting a point T2 slightly lower than the front end of the recess 40 to the reference point T1 taken as a ridge line; and also the under cowl 21 is tilted so as to be bent inside the vehicular body with a line L2 connecting a point T3 at the lower end of the top portion 42 to the reference point T1 taken as a ridge line. The line L2 is curved along the arc shape of the top portion 42. In this way, the portion of the under cowl 21, located under the ridge lines L1 and L2 each of which passes through the reference point T1 positioned in front of the leading end 42a of the top portion 42 formed into the arc shape in a side view, is formed into a tilt plane bent inside the vehicular body.

The flow of running wind in the vicinity of the second opening portion 23 and its neighborhood during running of the motorcycle 1 will be described below.

During running of the motorcycle 1, running wind is led in the cowling through the running wind inlet 20A provided in the front portion of the middle cowl 20 and the first opening portions 22 and the second opening portions 23 provided in the side portions of the middle cowl 20. With respect to the running wind led in each second opening portion 23, since the curved portion 41 is swelled outwardly from the second opening portion 23 as shown in FIGS. 16 and 17, running wind flowing along the outer surface of the under cowl 21 strikes the curved portion 41. Part (shown by an arrow y1) of the running wind, which has struck the curved portion 41, is led in the cowling. The other (shown by an arrow y2) of the running wind, which his struck the curved portion 41, flows downwardly along the top portion 42 formed on the rear side of the curved portion 41 and the tilt plane bent from the ridge lines L1 and L2. Accordingly, the amount of running wind, which directly strikes the driver's legs located at the back of the middle cowl 20, can be suppressed.

The running wind, led into the cowling through the running wind inlet 20A provided in the middle cowl 20, passes through the cowling while cooling the engine 8 and the exhaust pipe 8A, and flows out of the cowling through the second opening portions 23. At this time, the hot air (shown by an arrow y3), which has flown out of the cowling through the second opening portion 23, flows onto the outer side of the cowling along the shape of the curved portion 41. The hot air then flows downwardly along the top portion 42 formed at the back of the curved portion 41 and the tilt plane bent from the ridge lines L1 and L2. Accordingly, the amount of hot air, which directly strikes the driver's legs located at the back of the middle cowl 20, can be suppressed.

In this embodiment, since the recess 40, which is recessed with respect to the middle cowl 20, is provided in the joint plane between the middle cowl 20 and the under cowl 21, the second opening portion 23 corresponding to the recess 40 can be easily formed only by joining the middle cowl 20 to the under cowl 21. At this time, the recess 40 can be provided on the middle cowl 20 side. However, since the joint plane between the middle cowl 20 and the under cowl 21 is tilted upwardly from the lower side as nearing to the rear side of the vehicular body, the provision of the recess 40 on the under cowl 21 side becomes advantageous in that the recess 40 allows the flow of running wind from the front side of the vehicular body to be more smoothly led in or out of the cowling therethrough. Since the curved portion 41, which gradually swells to the outside of the cowling as nearing from the recess 40 to the rear side of the vehicular body is formed in such a manner as to be continuous to the recess 40, the flow of air in or out of the cowling is performed along the curved portion 41. The provision of the curved portion 41 is also advantageous in terms of improving appearance of the vehicle. Further, since the top portion (ridge line) 42 having the arc shape in a side view is formed at the back of the curved portion 41, and the portion under the ridge lines L1 and L2 is taken as the tilt plane bent inside the vehicular body, running wind or hot air flows downwardly of the vehicular body along the curved portion 41 and the tilt plane. As a result, the amount of running wind or hot air directly striking the driver's legs can be suppressed. Therefore, it is possible to solve the problem during running of the vehicle, that the driver may feel uncomfortable due the fact that running wind or hot air strikes the driver's legs.

The driver's seat 10 according to this embodiment is provided with its height adjustable. The mechanism of adjusting the height of the driver's seat will be described with reference to FIGS. 18, 19, FIGS. 20(a) and 20(b), and FIGS. 21(a) to 21(c).

Figure 18:
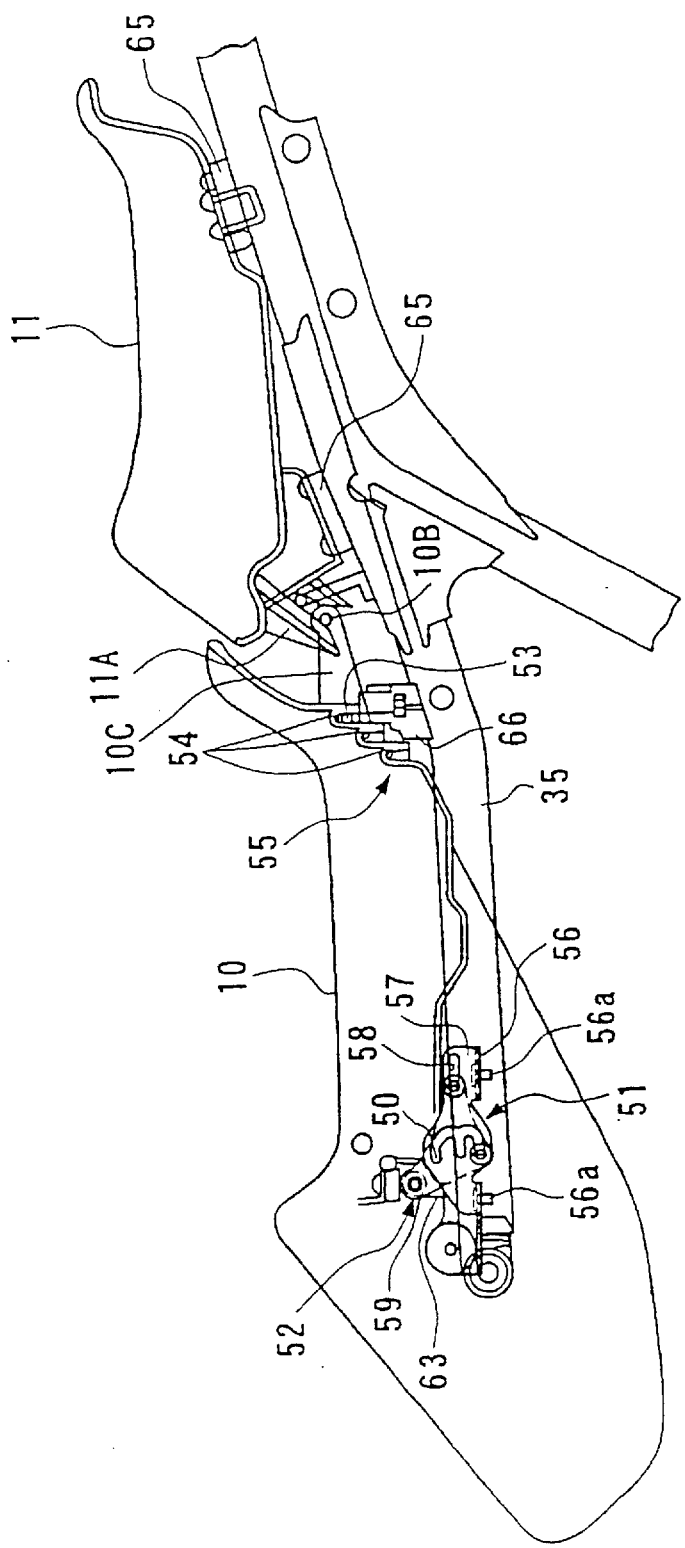
FIG. 18 is a side view of a seat structure.
Figure 19:
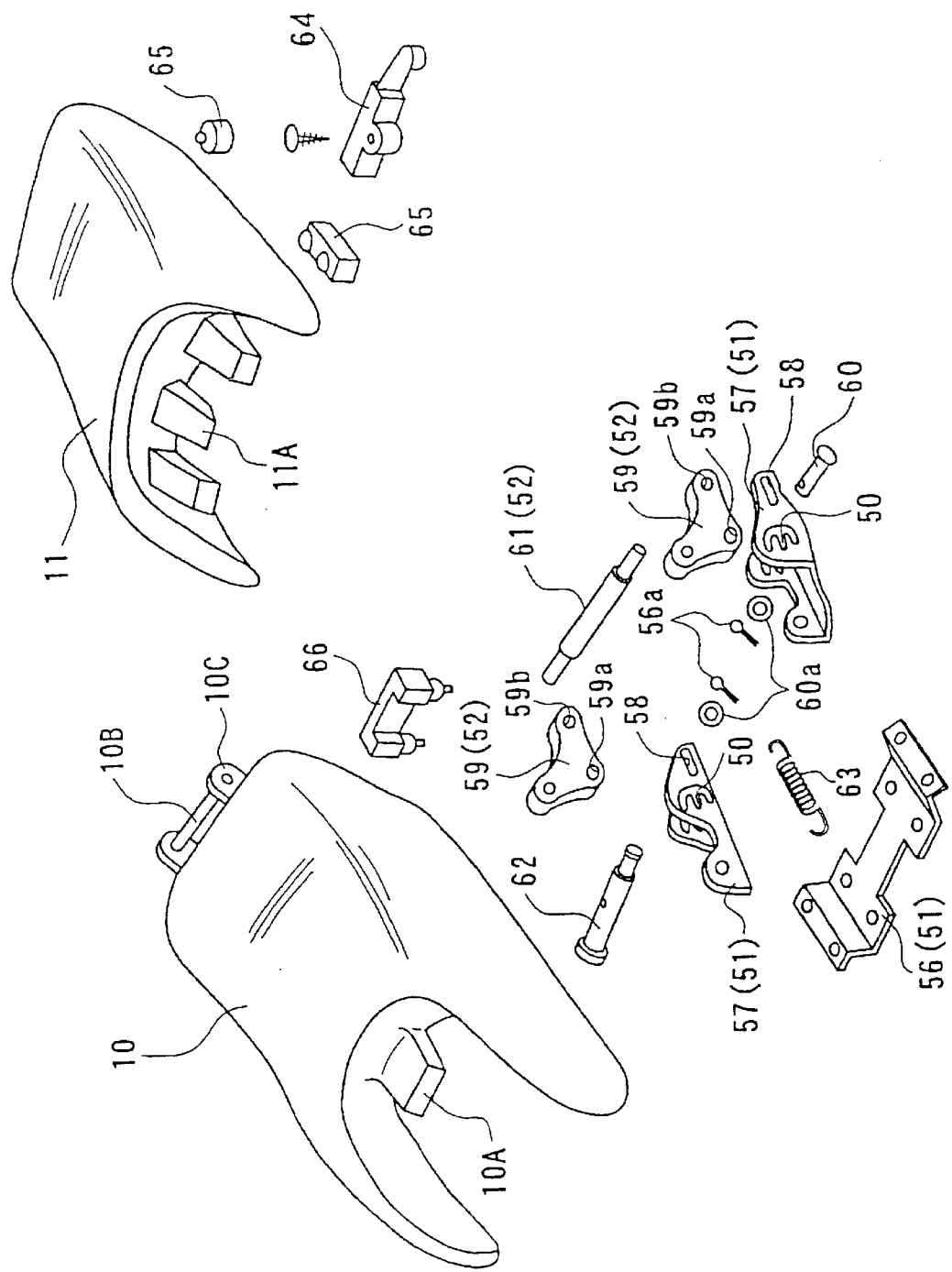
FIG. 19 is a configuration view of parts of the seat structure.
Figure 20A:
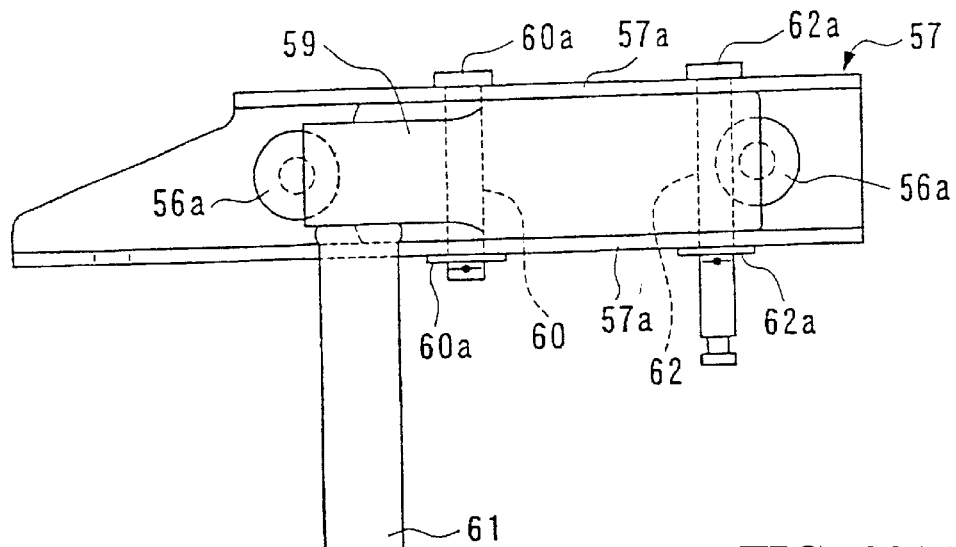
FIGS. 20(a) and 20(b) are a top view and a side view showing a first supporting portion and a second supporting portion of the seat structure, respectively.
Figure 20B:
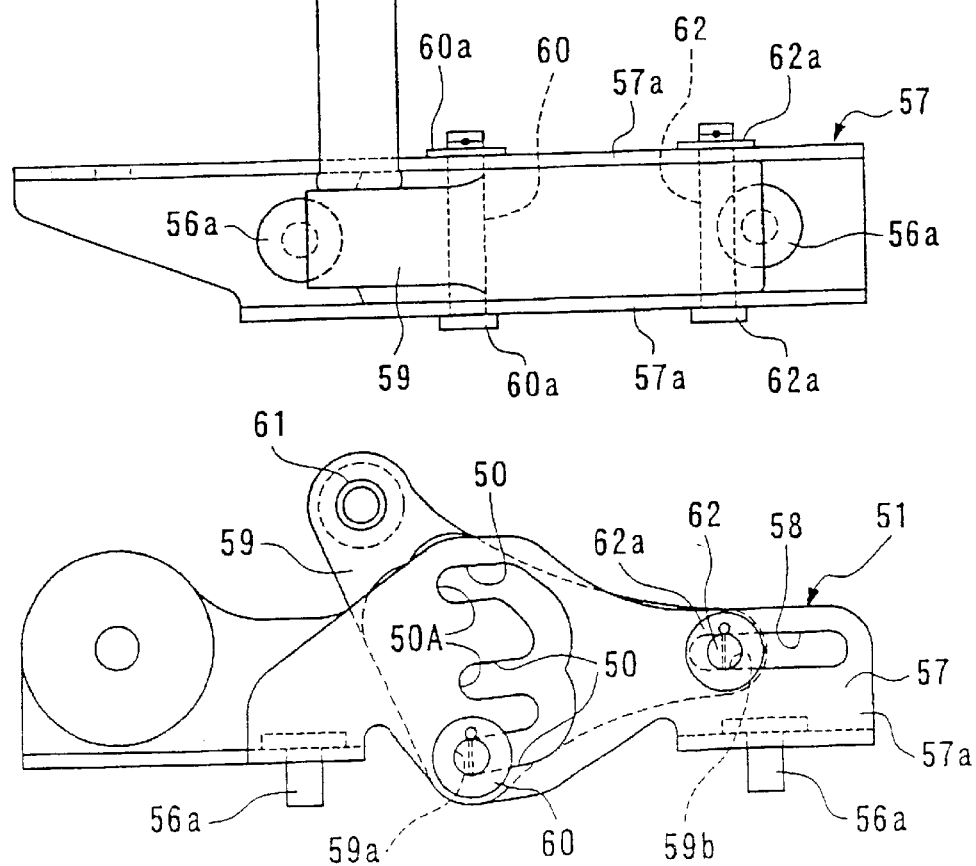
Figure 21A:
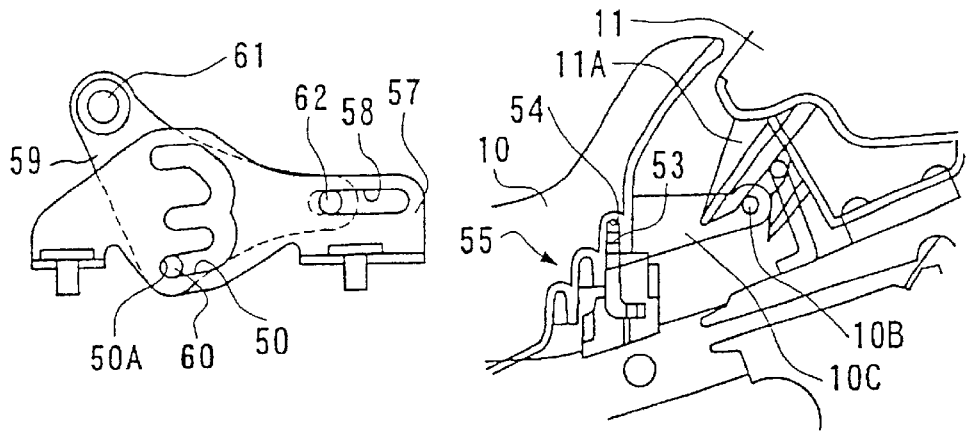
FIGS. 21(a) to 21(c) are views illustrating states of the seat structure in the case of adjusting the position of a seat.
Figure 21B:
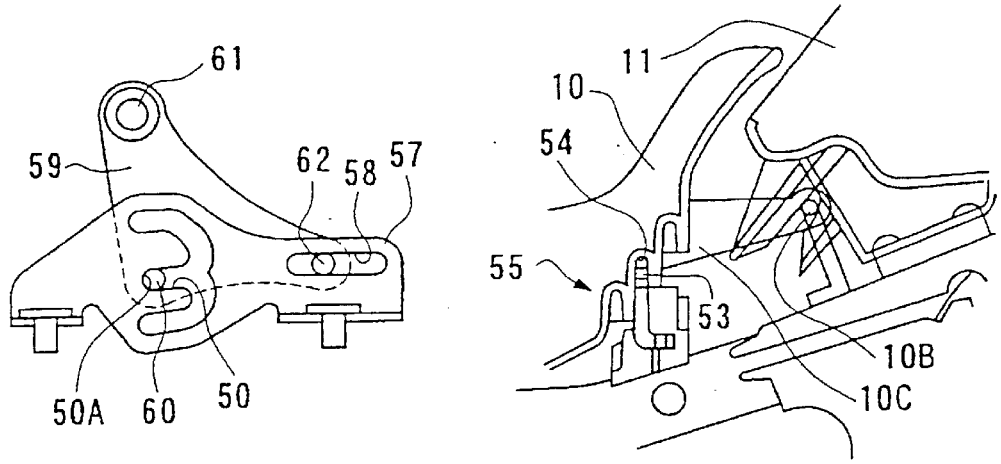
Figure 21C:
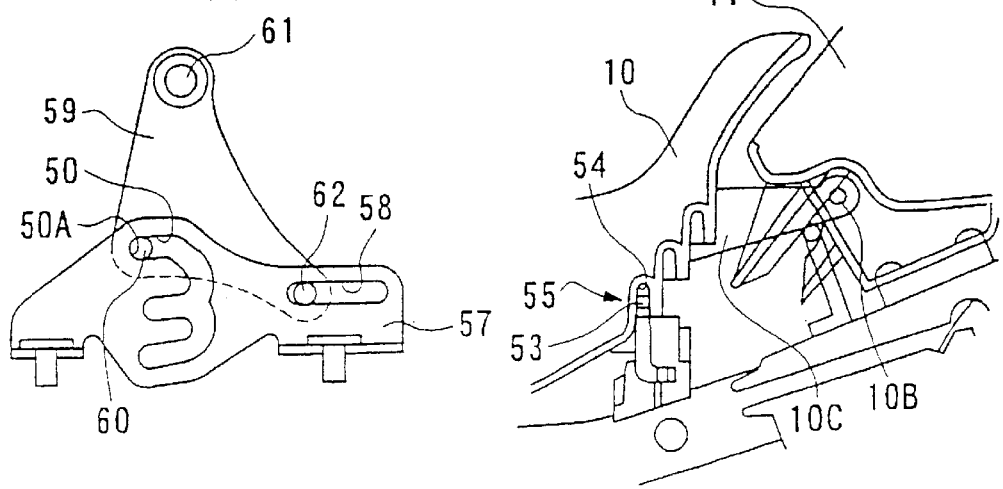

FIG. 18 is an enlarged side view showing an essential portion of a seat structure according to the present invention. FIG. 19 is a view showing parts of the seat structure. FIGS. 20(a) and 20(b) are a top view and a side view, showing a first supporting portion and a second supporting portion of the seat structure, respectively. FIGS. 21(a) to 21(c) are views each illustrating states of the first and second supporting portions and a third supporting portion in the case of adjusting the height of the driver's seat.

The motorcycle 1 has the driver's seat 10 and the pillion seat 11, each of which is removably mounted to the vehicular body. The height of the driver's seat 10 is adjustable, while the height of the pillion seat 11 is nonadjustable. The seat structure of the motorcycle 1 includes a first supporting portion 51, a second supporting portion 52, a stepped portion 55, and a third supporting portion 53. The first supporting portion 51 is provided on the vehicular body and having a plurality of groove portions 50 arranged in the height direction. The second supporting portion 52 is engageable in each of the groove portions 50, and is adapted to support a specific position of a front portion of the driver's seat 10 in the state being engaged in one of the groove portions 50. The stepped portion 55 is provided at a specific position of a rear portion of the driver's seat 10 and having a plurality of steps 54. The third supporting portion 53 is provided at a position, behind the first supporting portion 51, of the vehicular body, and is able to support the selected step 54 of the driver's seat 10.

The first supporting portion 51 is fixed to the seat frames 35 of the body frame 2 at a position behind the fuel tank 9. As shown in FIGS. 18 and 19, the first supporting portion 51 includes a front cross plate 56 fixed to the seat frames 35, and two adjuster brackets 57 fixed to the front cross plate 56. Each of the adjuster brackets 57 has the groove portions 50. The seat frames 35, the front cross plate 56, and the adjuster brackets 57 are fixed to each other by means of fixing members 56a such as screws.

As shown in FIGS. 19, 20(a) and 20(b), the two adjuster brackets 57 of the first supporting portion 51 are disposed in the width direction of the vehicular body with a specific distance put therebetween. Each of the adjuster brackets 57 has two supporting plate portions 57a opposed to each other. Each of the supporting plate portions 57a is provided with its plate surfaces extending in parallel to the height direction and the longitudinal direction of the vehicular body.

The groove portions 50 of three pieces, each of which is longer in the longitudinal direction of the vehicular body, are provided in each of the supporting plate portions 57a of the adjuster bracket 57 in such a manner as to be spaced from each other in the height direction. The three groove portions 50 are arranged in the height direction extend substantially in parallel to each other and are, on its rear end side, continuous to each other by means of one vertical groove. Meanwhile, the front end side of each of the groove portions 50 is closed, to form a lock portion 50A. As shown in FIG. 20(b), a reversed E-shaped groove portion is formed by the three groove portions 50 arranged in the height direction. It is to be noted that the shapes of the three groove portions 50 formed in one of the supporting plate portions 57a are symmetric to those of the other of the supporting plate portions 57a.

In each of the adjuster brackets 57 of the first supporting portion 51, a guide groove 58 as a second groove portion is formed in a portion, on the rear side of the groove portions 50, of each of the supporting plate portions 57a. The guide groove 58 is longer in the longitudinal direction of the vehicular body. The shape of the guide groove 58 formed in one of the supporting plate portions 57a is symmetric to that of the guide groove 58 formed in the other of the supporting plate portions 57a.

The second supporting portion 52 has two adjuster guides (connecting members) 59, two first pin portions 60, and an adjuster bar (bar-like member) 61. The adjuster guide 59 is disposed between the opposed supporting plate portions 57a of one of the adjuster brackets 57. The first pin portion 60 is mounted in a first hole portion 59a of the adjuster guide 59. Both the ends of the adjuster bar 61 are connected to the adjuster guides 59 disposed in the width direction of the vehicular body with a distance put therebetween. The connection position at which the end of the adjuster bar 61 is connected to the adjuster guide 59 is higher than the mounting position at which the first pin portion 60 is mounted to the adjuster guide 59. In the case of inserting the pin portion 60 in the first hole portion 59a of the adjuster guide 59, both the ends of the first pin portion 60 project outwardly. Each of the ends of the first pin portion 60 is engaged in one of the groove portions 50 formed in the supporting plate portion 57a of the adjuster bracket 57. In this case, each end of the first pin portion 60 is inserted in a washer 60a and is then engaged in one of the groove portions 50, and consequently, the end of the pin portion 60 in the state being engaged in one of the groove portions 50 is not removed therefrom. The end of the first pin portion 60 is movable from one to another of the three groove portions 50 arranged in the height direction and continuous to each other on the rear side. With the movement of the first pin portions 60, the adjuster guides 59 fixed to the first pin portions 60 and the adjuster bar 61 fixed to the adjuster guides 59 are movable along the groove shape of the groove portions 50. The second supporting portion 52 is thus movable along the groove shape of the groove portions 50 continuous to each other.

A second hole portion 59b is formed, in the adjuster guide 59, on the rear side of the first hole portion 59a. A second pin portion 62 is mounted in the second hole portion 59b. In the case of mounting the second pin portion 62 in the second hole portion 59b of the adjuster guide 59, both the ends of the second pin portion 62 project outwardly. Each of the ends of the second pin portion 62 is engaged in the groove portion 58 formed in the supporting plate portion 57a of the adjuster bracket 57. In this case, each end of the second pin portion 62 is inserted in a washer 62a and is then engaged in the groove portion 58, and consequently, the end of the second pin portion 62 in the state being engaged in the groove portion 58 is not removed therefrom. The second pin portion 62 is slidable along the guide groove 58. At this time, the second pin portion 62 is supported by the guide groove 58, so that the adjuster guide 59 is not turned, with its posture kept as it is.

As shown in FIGS. 18 and 19, a spring (biasing member) 63 are connected to the adjuster bar 61. One end of the spring 63 is connected to the adjuster bar 61, and the other end thereof is connected to the front cross plate 56. The spring 63 is set to have a force pulling the adjuster bar 61 forwardly of the vehicular body. To be more specific, the adjuster bar 61 of the second supporting portion 52 is biased to the front end side of the groove portions 50 by the spring 63, and each of the pin portions 60 connected to the adjuster bar 61 via the adjuster guides 59 is locked by the lock portion 50A, on the front end side, of one of the groove portions 50. At this time, the pin portion 60 usually presses the lock portion 50A, on the front end side, of one of the groove portions 50 by a specific force based on the biasing force of the spring 63.

The stepped portion 55, provided on the rear portion of the driver's seat 10, has the steps 54 of three pieces. As shown in FIG. 18, each of the steps 54 is formed into a recess opened downwardly in a sectional side view. The positions of the steps 54 become higher as nearing the rear side of the vehicular body. The third supporting portion 53 to be engaged with the stepped portion of the driver's seat 10 for supporting the rear portion of the driver's seat 10 is provided at a position, on the rear side of the first supporting portion 51, of the seat frames 35 of the vehicular body. The third supporting portion 53 has a projecting portion to be engageable in the steps 54 having the recessed shape. The third supporting portion 53 in this embodiment is configured as a bar member extending in the width direction of the vehicular body. As shown in FIGS. 18 and 19, a damper material 66 such as a rubber pad is interposed between the third supporting portion 53 and the seat frame 35 for reducing impact applied to the driver astride the driver's seat 10 during running of the vehicle. As shown in FIGS. 18 and 19, a supporting member 64 and a damper material 65 are provided between the pillion seat 11 and the vehicular body.

As shown in FIG. 19, a projecting portion 10A to be engageable with the adjuster bar 61 of the second supporting portion 52 provided on the vehicular body is formed on the front portion of the driver's seat 10. The projecting portion 10A projects forwardly of the vehicular body. Meanwhile, a bar member 10B to be engageable with the pillion seat 11 is provided on the rear end of the driver's seat 10. The bar member 10B is supported by a supporting portion 10C provided at the rear end of the driver's seat 10. The bar member 10B extends in the width direction of the vehicular body with a gap put between the bar member 10B and the driver's seat 10. Projecting portions 11A to be engageable with the bar member 10B of the driver's seat 10 are formed on the front portion of the pillion seat 11. The projecting portions 11A project forwardly of the vehicular body.

A procedure of adjusting a position (in the height direction) of the driver's seat 10 will be described below.

In the case of adjusting the height of the driver's seat 10, first, both the driver's seat 10 and the pillion seat 11 are removed from the vehicular body.

The positions of the adjuster guides 59 connected to the adjuster bar 16 of the second supporting portion 52 are set such that the adjuster bar 61 is disposed at a desired height position. In this case, the adjuster bar 61 is held by the driver or the like, and the adjuster guides 59 connected to the adjuster bar 61 are moved rearwardly of the vehicular body against the biasing force of the spring 63 by the driver. Along with the movement of the adjuster guides 59, the first pin portions 60 are each moved in the groove portions 50 to the continuous portion at the rear end of the groove portions 50 and engaged in a selected one of the groove portions 50. The holding of the adjuster bar 61 by the driver is then released.

As a result, the adjuster bar 61 is biased forwardly of the vehicular body by the biasing force of the spring 63, and thereby the first pin portion 60 of the adjuster guides 59, being engaged in the selected one of the groove portions 50, is locked in the lock portion 50A thereof. The positions of the adjuster guides 59 and the adjuster bar 61 are thus determined and held. To be more specific, in the case of adjusting the driver's seat 10 at a lower position, as shown in FIG. 21(a), the pin portion 60 is engaged in the lower one of the three groove portions 50 arranged in the height direction. In the case of adjusting the driver's seat 10 at a higher position, as shown in FIG. 21(c), the first pin portion 60 is engaged in the higher one of the three groove portions 50 arranged in the height direction. Further, in the case of adjusting the driver's seat 10 at an intermediate position, as shown in FIG. 21(b), the first pin portion 60 is engaged in the middle one of the three groove portions 50 arranged in the height direction.

When the first pin portion 60 is engaged in either of the groove portions 50, the adjuster guides 59 are biased to be turned around the first pin portion 60; however, since the second pin portion 62 is supported in the slot-like guide groove 58, the adjuster guides 59 are prevented from being turned. As a result, the postures of the adjuster guides 59 and the adjuster bar 61 are held. Also, since the second pin portion 62 is slidably supported in the guide groove 58, the movement of the first pin portion 60 to the selected one of the groove portions 50 is not obstructed by the second pin/portion 62.

After the height position of the adjuster bar 61 of the second supporting portion 52 is determined, the projecting portion 10A of the driver's seat 10 is inserted in the adjuster bar 61, and then the rear portion of the driver's seat 10 is turned downwardly with the projecting portion 10A kept as supported by the adjuster bar 61. In such a state, the selected one of the steps 54 formed in the rear portion of the driver's seat 10 is supported by the third supporting portion 53 provided on the vehicular body. At this time, the formation positions of the steps 54 of the driver's seat 10 are set such that when each of the pin portions 60 of the adjuster guides 59 is engaged in the selected one of the plurality of groove portions 50 of the adjuster brackets 57, one of the steps 54, which corresponds to the selected groove portion 50, is supported by the third supporting portion 53.

To be more specific, if the lower one of the groove portions 50 arranged in the height direction is selected as shown in FIG. 21(a), the rear one of the three steps 54 formed in the driver's seat 10 is supported by the third supporting portion 53. If the middle one of the three groove portions 50 arranged in the height direction is selected, the central one of the three steps 54 formed in the driver's seat 10 is supported by the third supporting portion 53. Further, if the upper one of the three groove portions 50 arranged in the height direction is selected, the forward one of the three steps 54 formed in the driver's seat 10 is supported by the third supporting portion 53.

In this way, the height position of the adjuster bar 61 is changed by selecting an arbitrary one of the plurality of groove portions 50, and the position (height position) of the driver's seat 10 is set on the basis of the height position of the adjuster bar 61. When the lower groove portion 50 is selected, the position of the driver's seat 10 is set to the lower position; when the upper groove portion 50 is selected, the position of the driver's seat 10 is set to the upper position; and when the middle groove portion 50 is selected, the position of the driver's seat 10 is set to the intermediate position.

After the driver's seat 10 is mounted to the vehicular body, the pillion seat 11 is mounted to the vehicular body. At this time, the pillion seat 11 is mounted to the vehicular body in a state that the bar member 10B of the driver's seat 10 is pressed by the projecting portion 11A of the pillion seat 11. The work of mounting the driver's seat 10 and the pillion seat 11 to the vehicular body is thus completed.

According to this embodiment, since the stepped portion for adjusting the position of the driver's seat is provided on the driver's seat side, it is possible to make the mechanism for adjusting the height of the driver's seat compact and hence to sufficiently ensure a space under the driver's seat. Also, since the position of the driver's seat is adjusted on the basis of the plurality of groove portions arranged in the height direction, it is possible to improve the workability in adjustment of the position of the driver's seat. Thus the position of the driver's seat after adjustment can be maintained.

Figure 22:
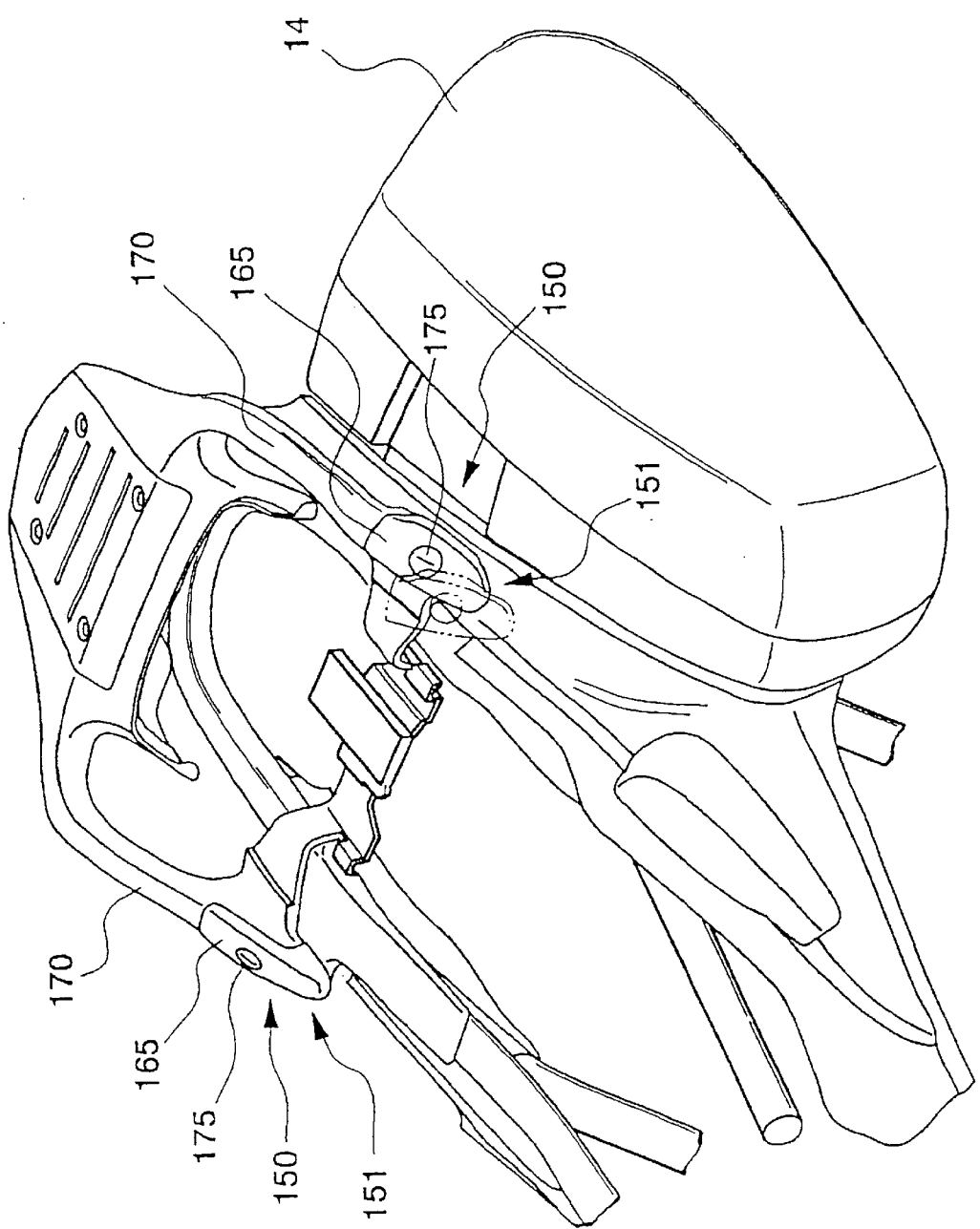
FIG. 22 is a perspective view showing a structure for supporting a side trunk.
Figure 23:
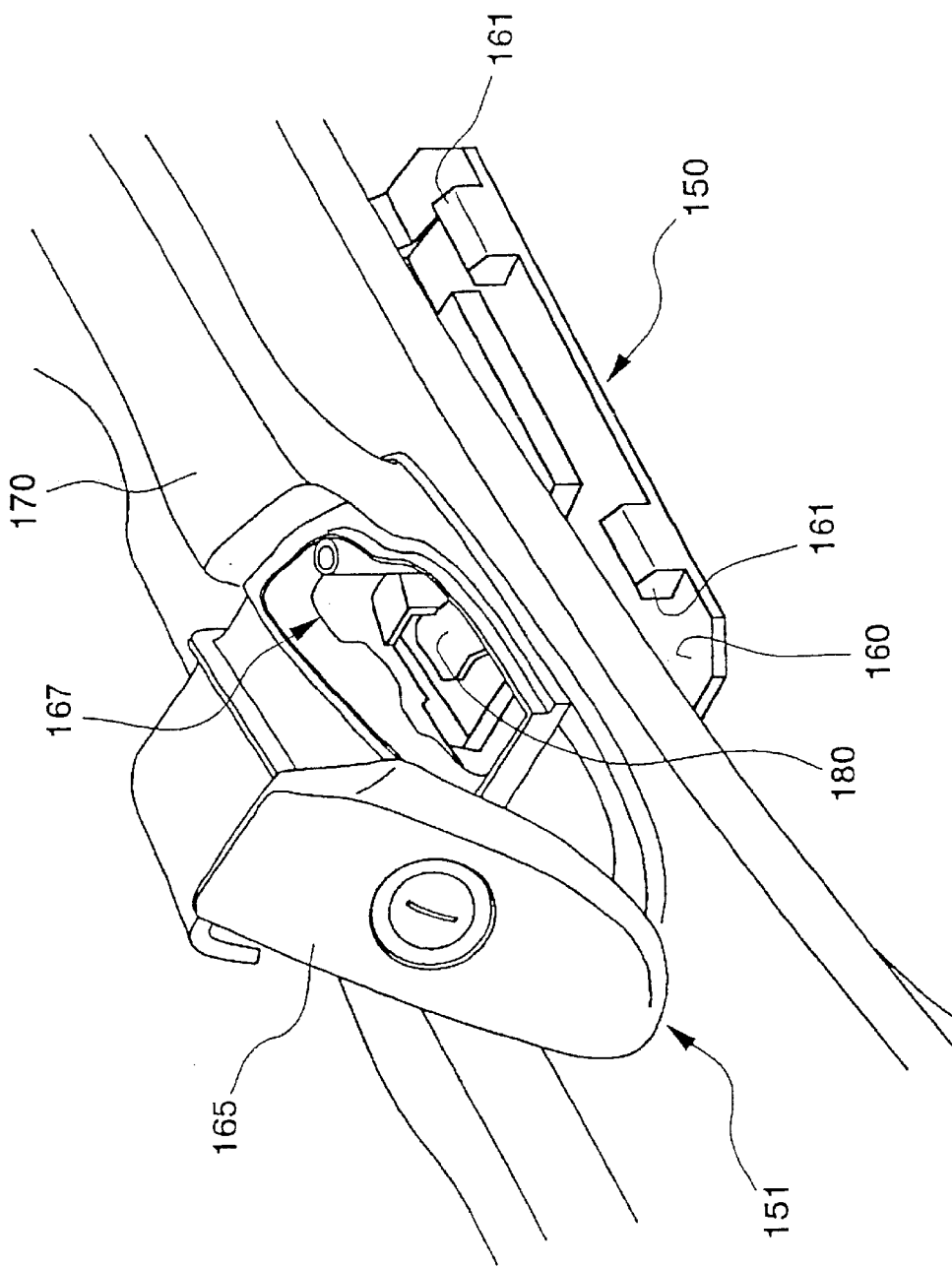
FIG. 23 is an enlarged perspective view showing the structure for supporting the side trunk on an enlarged scale.
Figure 24:
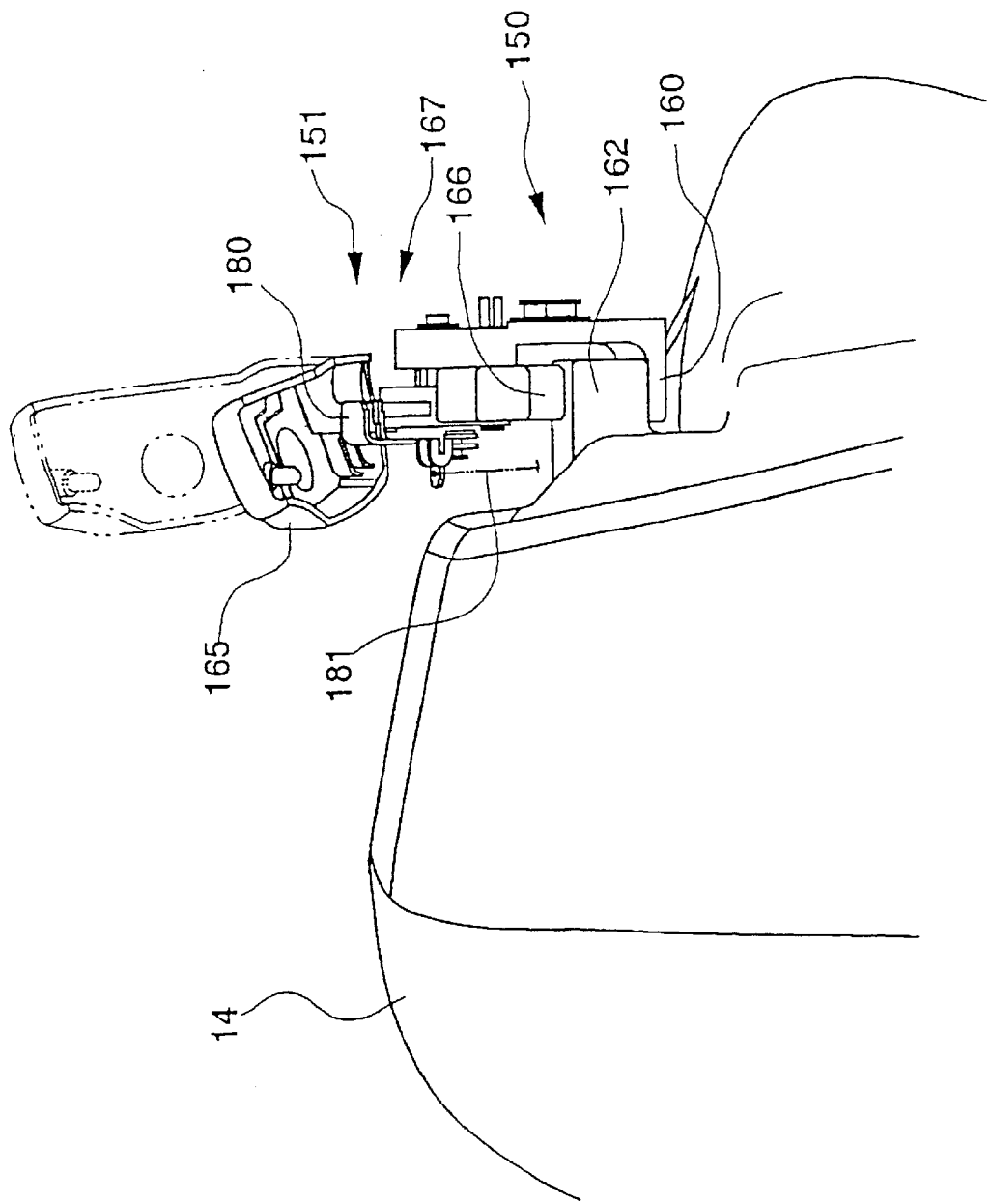
FIG. 24 is a rear view showing the structure for supporting the side trunk.
Figure 25:
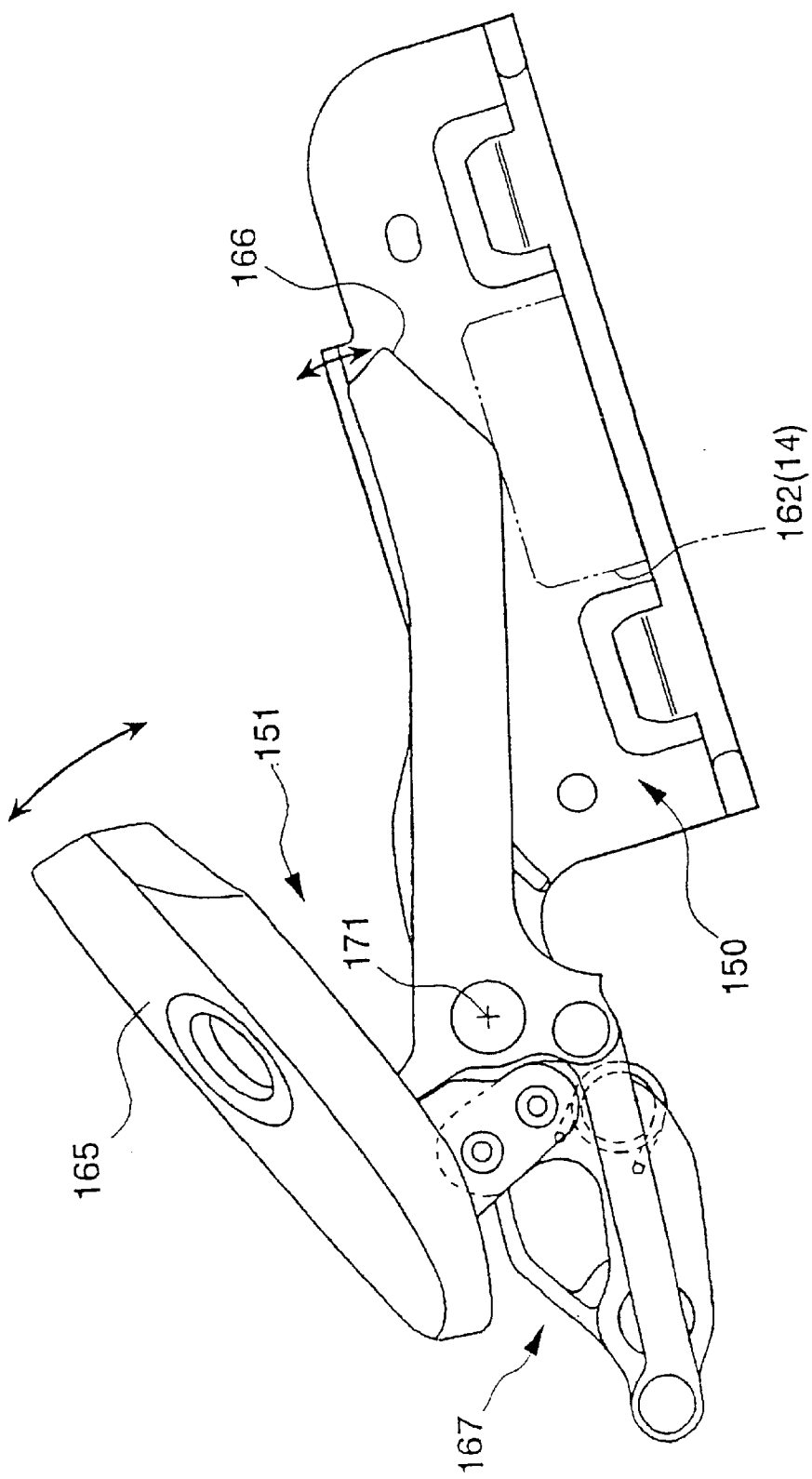
FIG. 25 is a view showing part of a mechanism of the structure for supporting the side trunk.

Another characteristic portion of the present invention will be described with reference to FIGS. 22 to 25. FIG. 22 is a perspective view showing a structure for supporting the side trunk 14. FIG. 23 is an enlarged perspective view of the supporting structure. FIG. 24 is a rear view of the supporting structure. FIG. 25 is a view showing a part of a mechanism of the supporting structure.

The side trunk 14 is removably mounted on each of the left and right sides of the rear portion of the vehicular body. The structure for supporting the side trunk 14 includes an engagement portion 150 for engaging the side trunk 14 to the vehicular body, and a lock portion 151 for locking a mounting state of the side trunk 14 engaged with the engagement portion 150.

As shown in FIGS. 23 and 24, the engagement portion 150 has a base plate 160, and a projection 161 provided on the base plate 160. A plate 162 supported by the base plate 160 is provided on a side surface of an upper portion of the side trunk 14 in such a manner as to project therefrom in the lateral direction. A groove in which the projection 161 of the base plate 160 is engaged is provided in the lower surface of the plate 162. The plate 162 of the side trunk 14 is disposed on the base plate 160, and the projection 161 of the base plate 160 is engaged in the groove formed in the plate 162, whereby the side trunk 14 is supported by the vehicular body.

The lock portion 151 has a trunk lock lever 165 for lock operation, a pressing plate 166 for pressing the plate 162 of the side trunk 14, and a link mechanism 167 for transmitting the motion of the trunk lock lever 165 to the pressing plate 166. According to this embodiment, the trunk lock lever 165 serves as part of a passenger's handle 170, and the link mechanism 167 is disposed inside the passenger's handle 170. The passenger's handles 170 are provided on both the sides of the pillion seat 11 shown in FIG. 1, and are connected to the seat frames 35.

As shown in FIG. 25, the pressing plate 166 is supported in such a manner as to be rotatable around a fulcrum 171 provided on the engagement portion 150, so that the opening/closing action of the trunk lock lever 165 is transmitted to the pressing plate 166 via the link mechanism 167, to press the plate 162 of the side trunk 14 or release the pressing state of the plate 162. In this embodiment, the lock state (closed state) of the trunk lock lever 165 is established when the trunk lock lever 165 is located at a lower position, and the lock release state (opened state) of the trunk lock lever 165 is established when the trunk lock lever 165 is located in an upper position. A biasing member such as a spring is mounted to the link mechanism, so that the lock release state (opened state) of the trunk lock lever 165 is kept by the biasing force of the biasing member.

As shown in FIGS. 22 and 23, a key lock portion 175 is provided on the trunk lock lever 165. By inserting a key in the key lock portion 175 and turning it on the lock side, the lock state (closed state) of the trunk lock lever 165 is kept. Meanwhile, by inserting the key in the key lock portion 175 and turning it on the unlock side, the trunk lock lever 165 is pushed up by the biasing force of the biasing member, whereby the lock state of the trunk lock lever 165 is released. In the lock state (closed state), the trunk lock lever 165 is integrated with the passenger's handle 170 in a state that the upper surface thereof is nearly continuous to the upper surface of the passenger's handle 170.

To be more specific, the surface shape of the trunk lock lever 165 is nearly the same as that of the upper portion of the passenger's handle 170. In the lock state (closed state), the trunk lock lever 165 is integrated with the passenger's handle 170 in a state that it does not project from the surface of the passenger's handle.

As shown in FIGS. 23 and 24, according to this embodiment, a seat lock lever 180 for locking the seat mounting state is disposed inside the trunk lock lever 165, that is, inside the passenger's handle 170. The seat lock lever 180 is mounted to the link mechanism 167 of the lock portion 151 and is connected to a seat locking mechanism via a wire 181. When the trunk lock lever 165 is in the lock release state (opened state), the seat lock lever 180 is exposed to the outside.

To be more specific, by inserting the key in the key lock portion 175 of the trunk lock lever 165 and turning it on the unlock side, thereby bringing the trunk lock lever 165 into the lock release state (opened state), the seat lock lever 180 disposed inside the passenger's handle 170 becomes operable. On the contrary, by depressing the trunk lock lever 165, thereby bringing the trunk lock lever 165 into the lock state (closed state), the seat lock lever 180 is concealed inside the trunk lock lever 165, and thereby the seat lock lever 180 becomes inoperable.

As described above, since the trunk lock lever 165 of the lock portion 151 for locking the side trunk 14 serves as part of the passenger's handle 170, and another mechanism of the lock portion 151 is disposed inside the passenger's handle 170, the lock portion 151 can be mounted with its outer portion less projecting from the vehicular body. This makes it possible to make effective use of a space in the vicinity of a location where the side trunk 14 is supported. Since in the lock state (closed state), the trunk lock lever 165 is integrated with the passenger's handle 170 in the state that the surface thereof is nearly continuous to that of the passenger's handle 170, it is possible to improve the appearance characteristic. As a result, it is possible to eliminate the need of adopting the related art configuration that the side trunk is formed so as to conceal the lock portion or the lock portion is disposed on the side trunk side, and hence to avoid a reduction in trunk volume caused by such a related art configuration.

An additional characteristic portion of the present invention will be described with reference to FIGS. 8 to 13.

Figure 8:
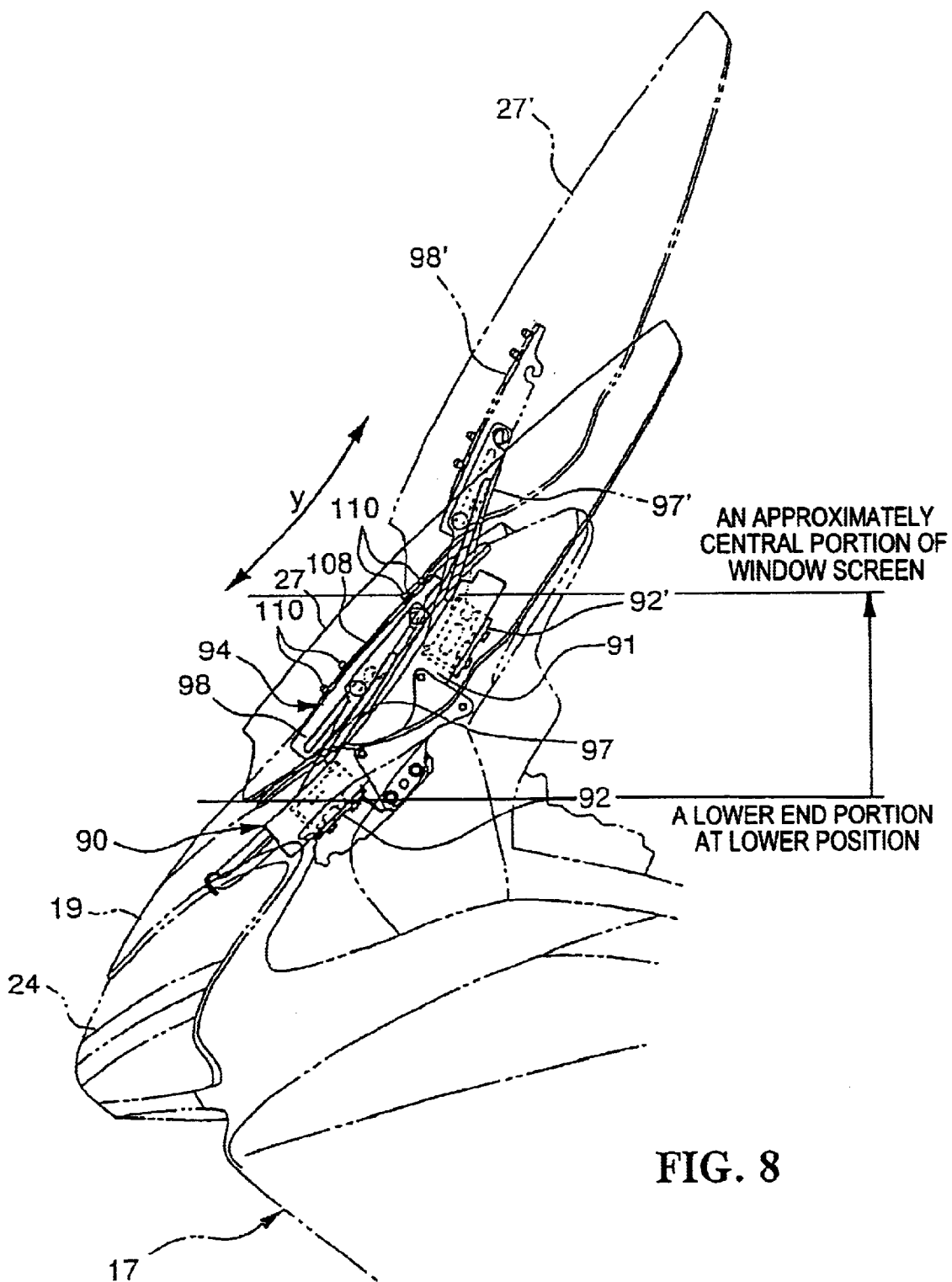
FIG. 8 is an enlarged side view of a window screen and its neighborhood.
Figure 9:
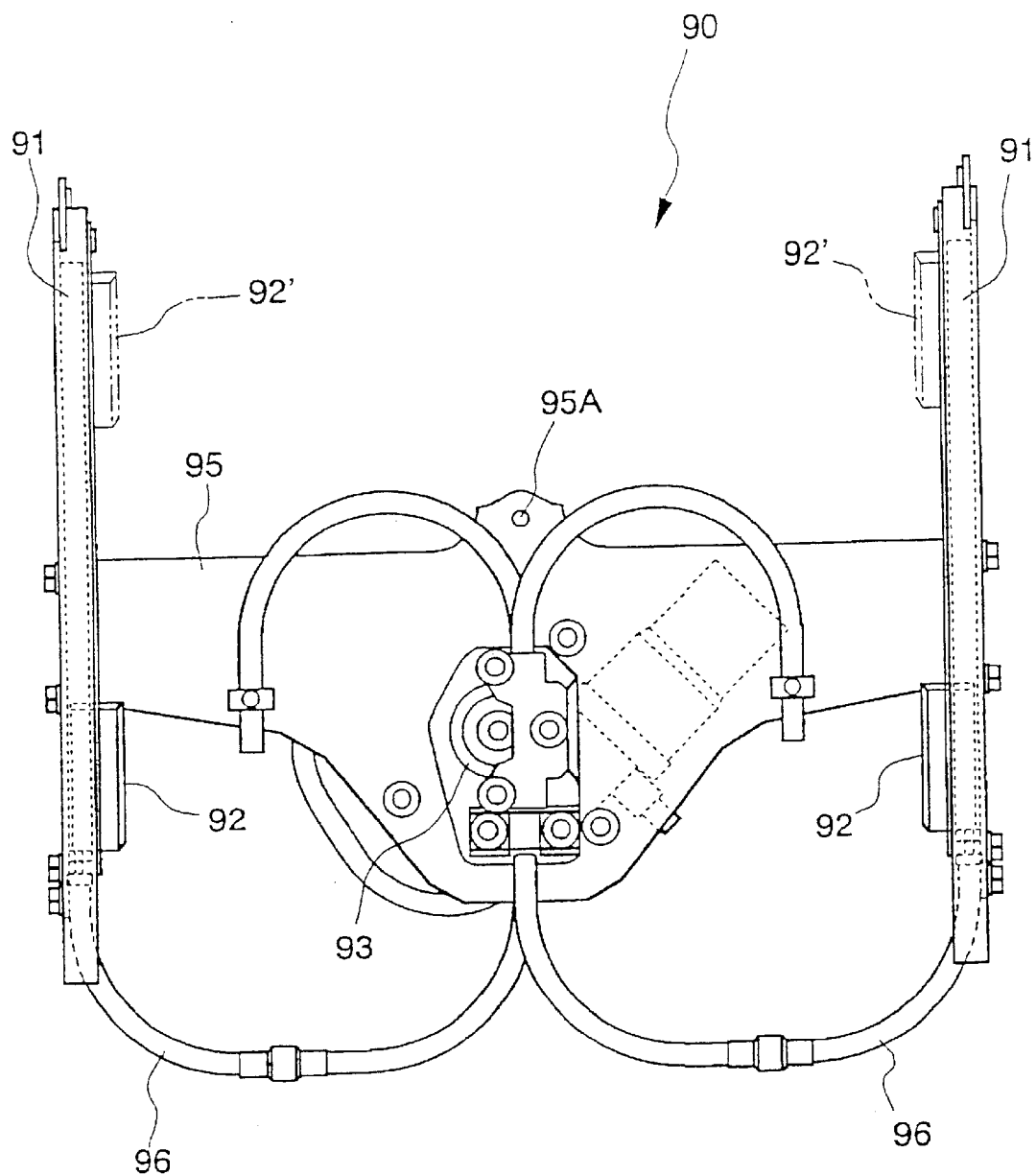
FIG. 9 is a front view of a moving unit.
Figure 10:
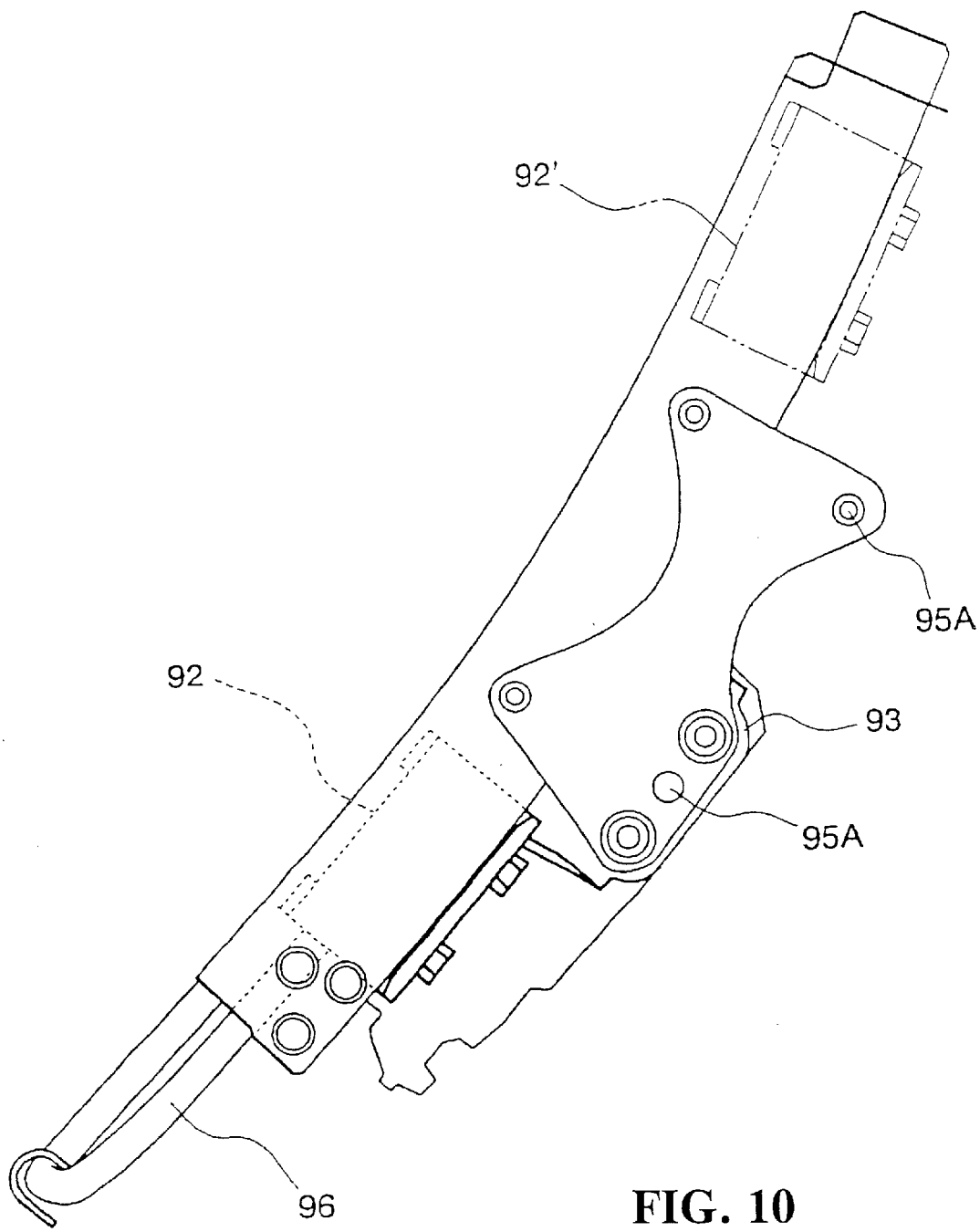
FIG. 10 is a side view of FIG. 9.
Figure 12A:
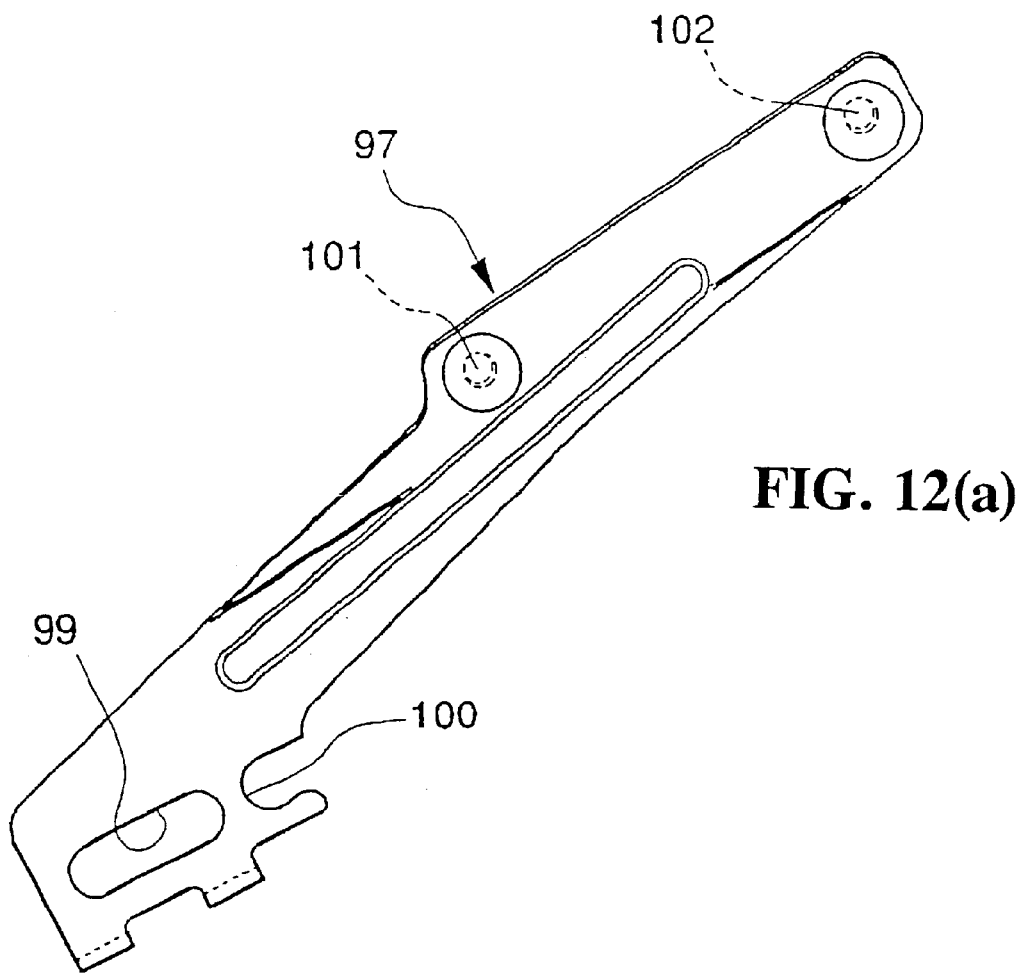
FIGS. 12(a) and 12(b) are views showing a first member of the coupling portion.
Figure 12B:
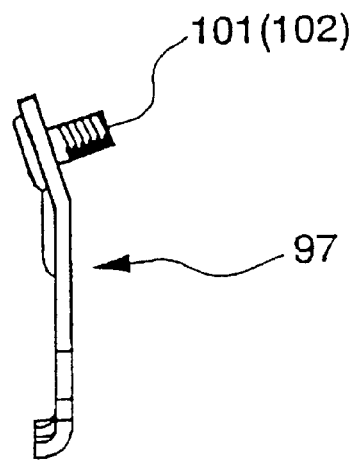
Figure 13:
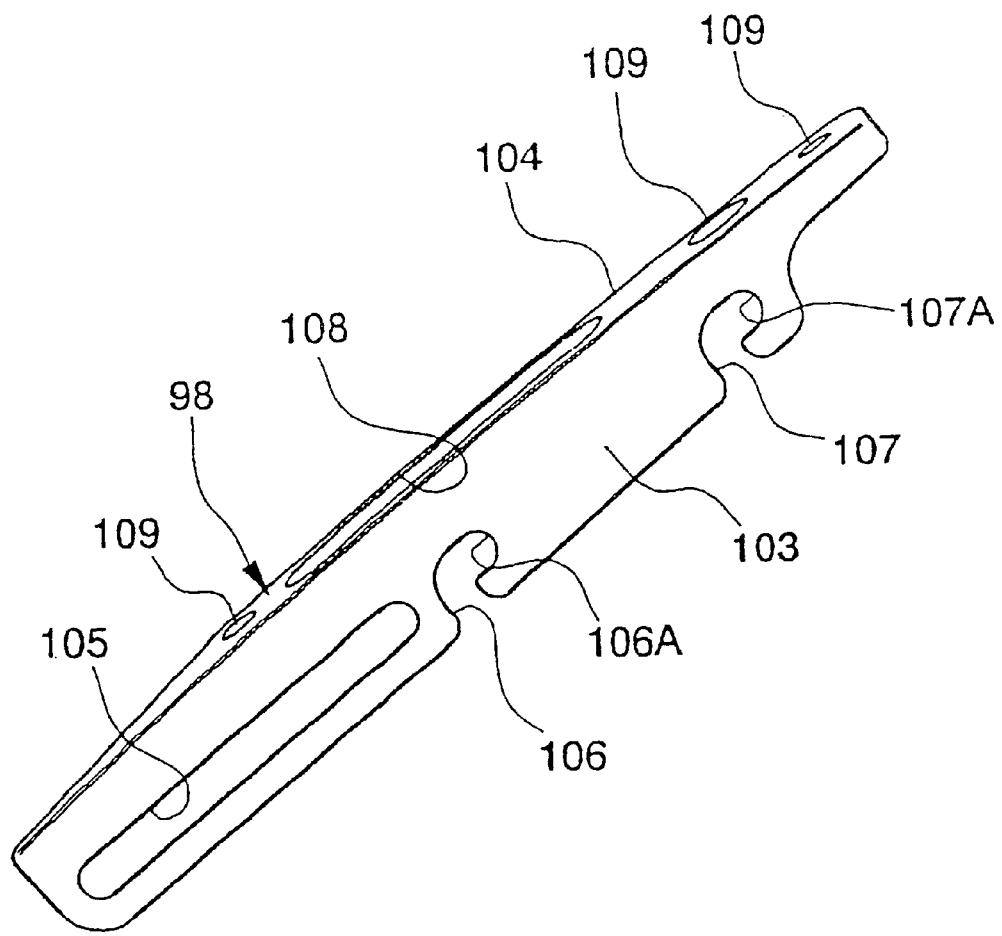
FIG. 13 is a view showing a second member of the coupling portion.

FIG. 8 is an enlarged side view of the window screen as the characteristic portion of the present invention and its neighborhood, FIG. 9 is a front view of a moving unit for moving the window screen, and FIG. 10 is a side view of FIG. 9, FIGS. 11(*a*) and 11(*b*) are views showing a coupling portion between the window screen and the moving unit. FIGS. 12(*a*) and 12(*b*) are views showing a first member constituting a part of the coupling portion, and FIG. 13 is a view showing a second member constituting the other part of the coupling portion.

As shown in FIG. 8, the window screen 27 tilted rearwardly over the vehicular body is provided over the upper cowl 19 for covering the upper forward portion of the vehicular body. The window screen 27 is movable almost along a tilt direction (shown by an arrow "y" in the figure) of the window screen 27 by a moving unit 90.

The moving unit 90 for moving the window screen 27 substantially along the direction "y" is mounted to the upper cowl 19 of the front cowl 17. The moving unit 90 includes a pair of left and right guide portions 91 extending in the direction "y", two movable portions 92 movably supported by the guide portions 91, an electric motor 93 representative of the moving unit for moving the movable portions 92 along the guide portions 91, and a coupling portion 94 for coupling the window screen 27 to the movable portions 92.

As shown in FIG. 9, the pair of left and right guide portions 91 are supported by both the ends of a supporting member 95 configured as a plate-like member, respectively. The supporting member 95 is mounted to the inner side of the upper cowl 19 by mounting members such as screws via a plurality of mounting portions 95A shown in FIGS. 9 and 10. The guide portions 91 are fixed to the inner side of the upper cowl 19 via the supporting member 95.

The movable portions 92 are slidably supported by the guide portions 91. The electric motor 93 as the moving unit is fixed to a central portion of the supporting member 95. The electric motor 93 is connected to each of the movable portions 92 slidably supported by the guide portions 91 by means of a push cable (drive unit) 96. The movable portion 92 is moved in the vertical direction while being guided by the guide portion 91 via the push cable 96 by drive of the electric motor 93. The movable portion 92 is moved in the upward direction via the push cable 96 (see reference numeral 92' in FIG. 9) by applying, for example, a plus voltage and a minus voltage to a terminal and a connector connected to the electric motor 93 respectively, to rotate the electric motor 93 in a specific direction. Meanwhile, the movable portion 92 is moved in the downward direction via the push cable 96 (see reference numeral 92 in FIG. 9) by applying a minus voltage and a plus voltage to the terminal and the connector connected to the electric motor 93 respectively, to rotate the electric motor 93 in the reverse direction.

The coupling portion 94 for coupling the movable portions 92 to the window screen 27 is, as shown in FIG. 8 and FIGS. 11(*a*) and 11(*b*), fixed to the movable portions 92. The coupling portion 94 has first members 97 extending substantially in the direction "y" (tilt direction), and second members 98 fixed to the window screen 27.

As shown in FIG. 8, FIGS. 11(*a*) and 11(*b*), and FIGS. 12(*a*) and 12(*b*), the first member 97 is formed into an approximately rectangular plate shape, and includes a hole portion 99 and a cutout portion 100, and a first projecting portion (fixing portion) 101 and a second projecting portion (fixing portion) 102. The hole portion 99 and the cutout portion 100 are formed on the lower end side (forward side of the vehicular body) of the first member 97 and are fixed to the movable portion 92 by means of mounting members such as screws. The first and second projecting portions 101 and 102 are provided on the first member 97 in such a manner as to be separated from each other with a specific gap put therebetween in the longitudinal direction. To be specific, the first projecting portion 101 is formed at an approximately central portion of the first member 97 in the longitudinal direction, and the second projecting portion 102 is formed on the upper end side (rear side of the vehicular body). The first member 97 is fixed to the movable portion 92 via the hole portion 99 and the cutout portion 100, to be thus moved along with the movement of the movable portion 92.

As shown in FIG. 8, FIGS. 11(a) and 11(b), and FIG. 13, the second member 98 is formed of a plate-like member having an L-shaped cross-section, and has a first plane 103 connected to the first member 97, and a second plane 104 connected to the window screen 27.

The first plane 103 of the second member 98 has a slot portion 105 extending from a central portion in the longitudinal direction to the lower end side, a first recess 106 cut in a central portion of a side, opposed to the second plane 104, of the first plane 103, and a second recess 107 cut in an upper end portion (rear side of the vehicular body) of the side, opposed to the second plane 104, of the first plane 103. The recesses 106 and 107 are curved in L-shapes toward the upper end sides, the depth portions of which are taken as lock portions 106A and 107A, respectively.

Each of the first and second projecting portions 101 and 102 of the first member 97 is engageable in the first and second recesses 106 and 107 having the lock portions 106A and 107A of the second member 98. The first projecting portion 101 of the first member 97 is engageable in the slot portion 105 of the second member 98.

The second plane 104 of the second member 98 has a slot portion 108 formed in an approximately central portion in the longitudinal direction, and a plurality (three in this embodiment) of hole portions 109 formed on both the sides of the slot portion 108. As shown in FIG. 8, the window screen 27 is fixed to the second member 98 by bringing the window screen 27 into contact with the second plane 104 of the second member 98, and connecting the window screen 27 to the second member 98 by means of mounting members 110 such as screws via the slot portion 108 and the hole portions 109 formed in the second plane 104 of the second member 98.

Figures 11A, 11B:
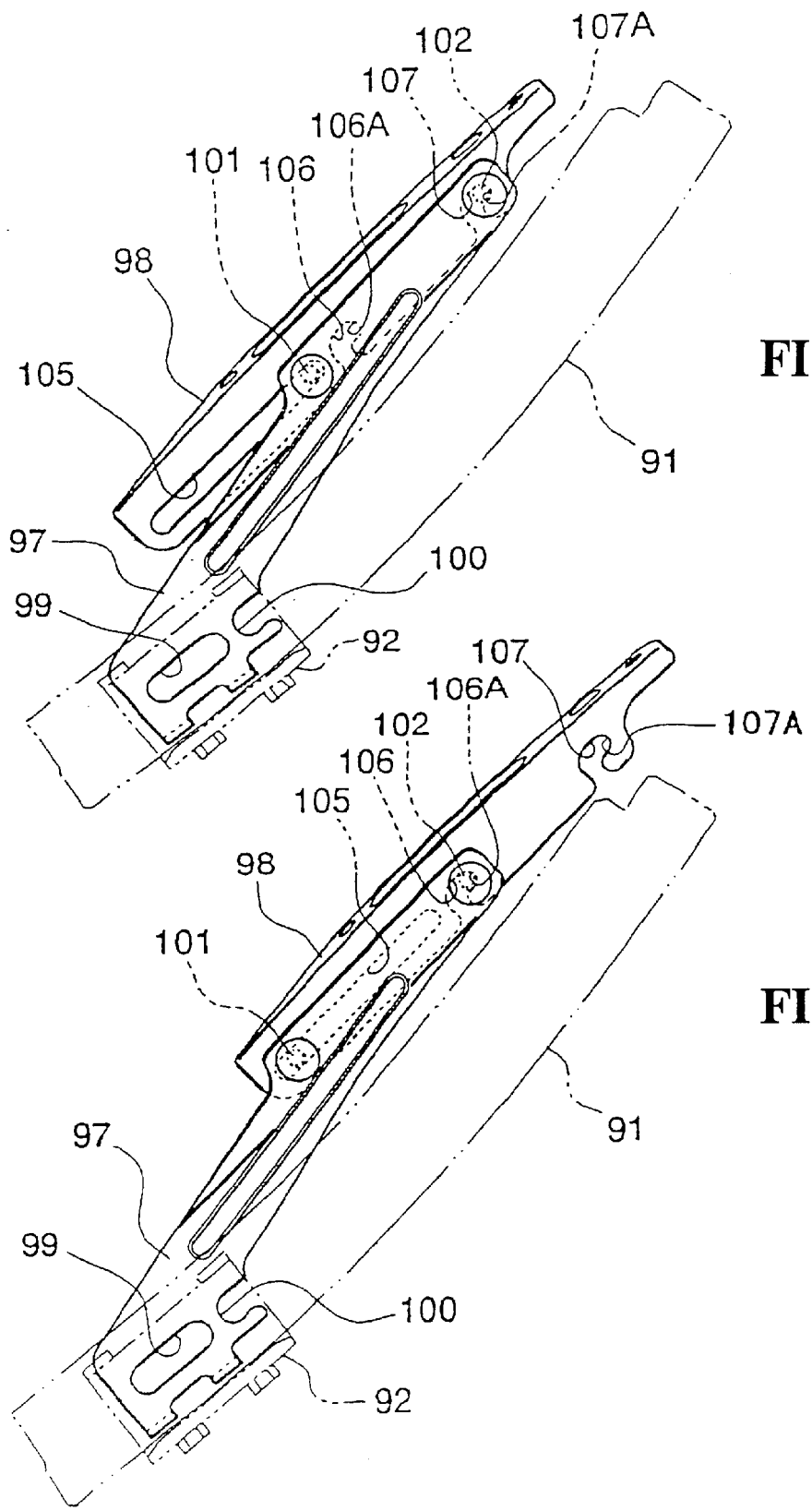
FIGS. 11(a) and 11(b) are views showing a coupling portion.

As shown in FIGS. 11(a) and 11(b), the second member 98 can be fixed to the first member 97 at two different positions in the longitudinal direction (the direction "y", tilt direction) of the first member 97. The second member 98 is fixed to the first member 97 at a lower position, called "first position", shown in FIG. 11(a) by engaging the first projecting portion 101 of the first member 97 in an upper end portion of the slot portion 105 of the second member 98 and also engaging the second projecting portion 102 of the first member 97 in the lock portion 107A of the second recess 107 of the second member 98. At this time, any portion of the first member 97 is not engaged in the first recess 106 of the second member 98.

Meanwhile, the second member 98 is fixed to the first member 97 at an upper position, called "second position", shown in FIG. 11(b) by engaging the first projecting portion 101 of the first member 97 in a lower end portion of the slot portion 105 of the second member 98, and also engaging the second projecting portion 102 in the lock portion 106A of the first recess 106 of the second member 98. At this time, any portion of the first member 97 is not engaged in the second recess 107 of the second member 98.

In this way, the first member 97 has the first projecting portion (fixing portion) 101 and the second projecting portion (fixing portion) 102 capable of fixing the second member 98 to the first member 97 at two different positions located almost along the tilt direction "y".

A procedure of moving the window screen 27 will be described below.

The upward movement of the window screen 27 is performed as follows. An operating switch (not shown) provided, for example, near the steering handlebar 4 is operated, to rotate the electric motor 93 as the drive unit in a specific direction. The left and right movable portions 92 are moved upwardly along the guide portions 91 by means of the push cables 96 pushed by rotation of the electric motor 93, whereby the window screen 27 connected to the movable portions 92 via the coupling portion 94 is moved upwardly almost in the tilt direction, to be located at an upper position (see window screen 27', first member 97', and second member 98' in FIG. 8, each of which has moved upwardly). In addition, as shown in FIGS. 8 and 10, according to this embodiment, since each of the guide portions 91 is formed into an arc shape slightly swelled rearwardly of the vehicular body, the window screen 27 is moved not perfectly along the tilt direction but with its upper end directed forwardly (that is, in a standing state). FIG. 8 also highlights that when said window screen is located at an upper position 27', a lower end portion of said window screen is located at an approximately central portion of said window screen at a lower position 27.

The downward movement of the window screen 27 is performed as follows. The operating switch is operated so as to rotate the electric motor 93 in the reverse direction. The push cables 96 are pulled by such rotation of the electric motor 93. The left and right movable portions 92 are moved downwardly along the guide portions 91 by the push cables 96, whereby the window screen 27 is moved downwardly and is located at a lower position.

As described above, the window screen 27 is electrically moved by moving the movable portions 92 along the guide portions 91 by using the electric motor 93.

According to this embodiment, the position of the window screen 27 can be changed by manually changing the positions of the second members 98 to the first members 97 of the coupling portion 94.

A procedure of manually changing the positions of the second members 98 to the first members 97 will be described below.

The position of each second member 98 is changed from the lower position shown in FIG. 11(a) to the upper position shown in FIG. 11(b) as follows. First, the second member 98 is slightly moved upwardly, to release the engagement state between the second projecting portion 102 of the first member 97 and the lock portion 107A of the second recess 107. The second member 98 is then moved upwardly, with the slot portion 105 of the second member 98 slid relative to the first projecting portion 101 of the first member 97, until the second projecting portion 102 of the first member 97 is inserted in and caught by the first recess 106 of the second member 98. The second member 98 is thus fixed at the upper position.

The position of the second member 98 is changed from the upper position shown in FIG. 11(b) to the lower position shown in FIG. 11(a) as follows. First, the second member 98 is slightly moved upwardly to release the engagement state between the second projecting portion 102 of the first member 97 and the lock portion 106A of the first recess 106. The second member 98 is then moved downwardly, with the slot portion 105 of the second member 98 slid relative to the first projecting portion 101 of the first member 97, until the second projecting portion 102 of the first member 97 is inserted in and caught by the second recess 107 of the second member 98. The second member 98 is thus fixed at the lower position.

In this way, the position of the window screen 27 by using the coupling portion 94 composed of the first members 97 and the second members 98 can be manually changed by a one-touch simple operation.

At this time, since the window screen 27 is fixed to the second members 98, it can be moved by movement of the second members 98. Also, since the projecting portions (fixing portions) 101 and 102 of each first member 97 are provided almost along the tilt direction in such a manner as to be separated from each other with a specific gap put therebetween, the window screen 27 can be moved substantially along the tilt direction by moving the window screen 27 with the aid of the projecting portions 101 and 102 arranged in the tilt direction.

As described above, since the position of the window screen 27 can be changed by the moving unit 90, even if the running speed or the like is changed, the driver can be protected from the running wind by moving the window screen 27. Also, since the window screen 27 is moved substantially along the tilt direction of the window screen 27 by the moving unit 90, the window screen 27 can be moved without any increase in the distance between the window screen 27 and the driver. As a result, even if the position of the window screen 27 and the running speed are changed, it is possible to suppress the back pressure applied to the driver.

Since the moving unit 90 has the movable portions 92 movable along the guide portions 91 and the window screen 27 is connected to the movable portions 92, the window screen 27 can be simply moved without use of any complicated mechanism.

In addition to the movement of the window screen 27 based on an electric power using the electric motor 93 of the moving unit 90, the manual movement of the window screen 27 can be realized by manually changing the positional relationship between the first member 97 and the second member 98 of the coupling portion 94 in a one-touch simple operation. In this way, according to this embodiment, the movement of the window screen 27 can be electrically or manually realized.

According to this embodiment, the two projecting portions, that is, the first and second projecting portions 101 and 102 are provided on the first member 97 and the two recessed portions, that is, the first and second recessed portions 106 and 107 are provided in the second member 98. Accordingly, the positional adjustment using the first member 97 and the second member 98 can be performed in two steps; however, the present invention is not limited thereto. The positional adjustment using the first member 97 and the second member 98 can be performed in a plurality of steps by providing three or more projecting portions on the first member 97 and also providing the corresponding recessed portions of the number equal to that of the projecting portions in the second member 98.

According to this embodiment, the projecting portions are provided as fixing portions on the first member 97 and the recessed portions engageable with the projecting portions are provided in the second member 98. However, the recessed portions may be provided in the first member 97 and the projecting portions be provided as fixing portions on the second member 98. That is to say, the present invention can be configured such that the second member has fixing portions for fixing the second member to the first member at a plurality of positions.

According to the present invention, since the position of the window screen can be changed by the moving unit, the position of the window screen can be changed on the basis of an operational state such as a change in running speed. As a result, the driver can be protected from being touched by running wind. Since the window screen is moved almost along the tilt direction of the window screen by the moving unit, the window screen can be moved without any increase in the distance between the window screen and the driver. As a result, it is possible to suppress the back pressure applied to the driver. In this way, since the window screen is movable substantially along the tilt direction as described above, a comfortable drive can be assured for the driver of the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle, comprising:
   a cowling for covering an upper front portion of a vehicular body;
   a window screen provided over said cowling in such a manner as to be tilted toward a rear side of the vehicular body of said motorcycle; and
   a moving unit for moving said window screen substantially along a tilt direction, such that when said window screen is located at an upper position, a lower end portion of said window screen is located at an approximately central portion of said window screen at a lower position.

2. The motorcycle according to claim 1, wherein said moving portion includes:
   a guide portion provided on said cowling in such a manner as to extend along said tilt direction;
   a movable portion movably supported by said guide portion;
   a drive unit for moving said movable portion along said guide portion; and
   a coupling portion for coupling said window screen to said movable portion.

3. The motorcycle according to claim 2, wherein said coupling portion includes:
   a first member fixed to said movable portion in such a manner as to extend along said tilt direction; and
   a second member fixed to said window screen,
   wherein said first member has a fixing portion capable of fixing said second member to said first member at one of a plurality of different positions in said tilt direction.

4. The motorcycle according to claim 3, wherein the first member is formed into an approximately rectangular shape, and includes a hole portion, a cutout portion, a first projecting portion, and a second projecting portion, and
   wherein the first member is fixed to the movable portion via the hole portion and the cutout portion.

5. The motorcycle according to claim 4, wherein the second member is formed of a plate member having an L-shaped cross section, said second member having a first plane connecting to the first member, and a second plane connecting the window screen.

6. The motorcycle according to claim 5, wherein the first plane of the second member has a slot portion extending from a central portion in the longitudinal direction to a lower end side of the first plane, and a plurality of recesses with lock portions cut into an upper end side of the first plane, wherein the first member is provided with projecting portions for engaging with the slot portion and the recesses of the second member.

7. The motorcycle according to claim 2, wherein the guide portion includes a right guide portion and a left guide portion each being formed into an arc shape with convex sides thereof facing rearwardly.

8. The motorcycle according to claim 2, further comprising push cables connected to said drive unit of the moving unit for sliding the movable portion along the guide portion.

9. A motorcycle, comprising:

a cowling for covering an upper front portion of a vehicular body;

a window screen provided over said cowling in such a manner as to be tilted toward a rear side of the vehicular body of said motorcycle;

a motor of a moving unit for moving said window screen substantially along a tilt direction; and a coupling portion of said moving unit capable of being manually adjusted to move said window screen substantially along said tilt direction, whereby movement of the window screen can be electrically or manually realized.

10. The motorcycle according to claim 9, wherein said moving unit includes:

a guide portion provided on said cowling in such a manner as to extend along said tilt direction; and a movable portion movably supported by said guide portion, wherein said coupling portion of said moving unit couples said window screen to said movable portion.

11. The motorcycle according to claim 10, wherein said coupling portion includes:

a first member fixed to said movable portion in such a manner as to extend along said tilt direction; and a second member fixed to said window screen, wherein said first member has a fixing portion capable of fixing said second member to said first member at one of a plurality of different positions in said tilt direction.

12. The motorcycle according to claim 11, wherein the first member is formed into an approximately rectangular shape, and includes a hole portion, a cutout portion, a first projecting portion, and a second projecting portion, and wherein the first member is fixed to the movable portion via the hole portion and the cutout portion.

13. The motorcycle according to claim 12, wherein the second member is formed of a plate member having an L-shaped cross section, said second member having a first plane connecting to the first member, and a second plane connecting the window screen.

14. The motorcycle according to claim 13, wherein the first plane of the second member has a slot portion extending from a central portion in the longitudinal direction to a lower end side of the first plane, and a plurality of recesses with lock portions cut into an upper end side of the first plane, wherein the first member is provided with projecting portions for engaging with the slot portion and the recesses of the second member.

15. The motorcycle according to claim 10, wherein the guide portion includes a right guide portion and a left guide portion each being formed into an arc shape with convex sides thereof facing rearwardly.

16. The motorcycle according to claim 10, further comprising push cables connected to said motor of the moving unit for sliding the movable portion up and down along the guide portion.

* * * * *